(12) United States Patent
Nakajima

(10) Patent No.: US 8,407,384 B2
(45) Date of Patent: *Mar. 26, 2013

(54) DISK ARRAY SUBSYSTEM AND CONTROL METHOD THEREOF

(75) Inventor: Akio Nakajima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/300,838

(22) Filed: Nov. 21, 2011

(65) Prior Publication Data

US 2012/0066420 A1 Mar. 15, 2012

Related U.S. Application Data

(63) Continuation of application No. 11/968,766, filed on Jan. 3, 2008, now Pat. No. 8,086,773.

(30) Foreign Application Priority Data

Mar. 30, 2007 (JP) ................................ 2007-090511

(51) Int. Cl.
*G06F 13/38* (2006.01)

(52) U.S. Cl. .................. 710/74; 710/2; 710/60; 710/300

(58) Field of Classification Search .................. None
See application file for complete search history.

(56) References Cited

U.S. PATENT DOCUMENTS

| | | | |
|---|---|---|---|
| 6,366,981 | B1 | 4/2002 | Koike |
| 6,886,051 | B2 | 4/2005 | Thiesfeld |
| 7,035,952 | B2 | 4/2006 | Elliott et al. |
| 2004/0193827 | A1 | 9/2004 | Mogi et al. |
| 2005/0289386 | A1 | 12/2005 | Tawill et al. |
| 2006/0047908 | A1 | 3/2006 | Chikusa et al. |
| 2006/0101171 | A1 | 5/2006 | Grieff et al. |
| 2006/0165000 | A1 | 7/2006 | Nakaminami et al. |
| 2006/0195624 | A1 | 8/2006 | Chikusa et al. |
| 2008/0244139 | A1 | 10/2008 | Nakajima |

FOREIGN PATENT DOCUMENTS

| | | |
|---|---|---|
| JP | 06090247 | 3/1994 |
| JP | 11167470 | 6/1999 |
| JP | 20043022751 | 10/2004 |
| JP | 2005149173 | 6/2005 |
| JP | 2006072636 | 3/2006 |
| JP | 2006209165 | 8/2006 |
| WO | 2007001728 A1 | 1/2007 |

OTHER PUBLICATIONS

Rob Elliot, SAS-2 Multiplexing (Draft) Revision 7, 05-381r7 , Nov. 2006, pp. 1-101, http://www.t10.org/ftp/t10/document.05/05-381r7.pdf (as of Mar. 2007).

Rob. Elliot, ANSI INCITS T10 1760-D Serial Attached SCSI-2 (Draft) Revision8, Jan. 26, 2007, http://www.t10.org/ftp/t10/drafts/sas2/sas2r08.pdf (as of Mar. 2007). Parts 1-5.

*Primary Examiner* — Ilwoo Park
(74) *Attorney, Agent, or Firm* — Brundidge & Stanger, P.C.

(57) ABSTRACT

This disk array subsystem includes a data input/output unit for inputting and outputting data in and from the network, a connecting unit for connecting the data input/output unit and a plurality of storage apparatuses, and a control unit for controlling the input and output of data in and from the network. The control unit includes a logical link setting unit for zoning at least one or more physical links among a plurality of physical links for inputting and outputting data between the data input/output unit and the connecting unit, or between the connecting unit and the connecting unit into at least one or more logical links, and setting a plurality of logical links to one physical link; and a link unit for simultaneously multiplexing the data to a plurality of the logical links set with the logical link setting unit, and linking the data to the physical link.

4 Claims, 21 Drawing Sheets

DISK ARRAY SUBSYSTEM AND CONTROL METHOD THEREOF

CROSS REFERENCE TO RELATED APPLICATIONS

The present application is a continuation of application Ser. No. 11/968,766, filed Jan. 3, 2008 now U.S. Pat. No. 8,086,733; which relates to and claims priority from Japanese Patent Application No. 2007-090511, filed on Mar. 30, 2007, the entire disclosure of which is incorporated herein by reference.

BACKGROUND OF THE INVENTION

The present invention generally relates to a disk array subsystem and its control method, and in particular relates to technology for optimizing the processing performance of a plurality of storage apparatuses storing data.

As one type of computer system, known is a disk array subsystem comprising a plurality of storage apparatuses. A disk array subsystem receives input/output commands from a host computer as an access source apparatus, or from other disk array subsystems. A disk array subsystem sends data retained in the storage apparatus to the access source apparatus, or sends data from the access source apparatus to one or more storage apparatuses provided to the disk array subsystem according to the foregoing input/output commands.

As this kind of disk array subsystem, there is the disk array subsystem disclosed in Japanese Patent Laid-Open Publication No. 2005-149173 (Patent Document 1). This disk array subsystem is attached to a plurality of storage apparatuses (disk drives, tape devices, etc.) using a fibre channel arbitrated loop (FC_AL: Fibre Channel Arbitrated Loop) as the connection interface.

Further, the specification of U.S. Pat. No. 7,035,952 (Patent Document 2) discloses a disk array subsystem newly adopting SAS (Serial Attached SCSI) as the connection interface of the storage apparatuses. Moreover, the specification of U.S. Published Application No. 2006/101171 (Patent Document 3) and Rob Elliott, ANSI INCITS T10 1760-D Serial Attached SCSI-2 (Draft) Revision8, 26 Jan. 2007, http://www.t10.org/ftp/t10/drafts/sas2/sas2r08.pdf (as of March 2007) (Non-Patent Document 1) disclose a SAS expander capable of forming a large-scale network by connecting expanders in a multistage tree structure. In addition, the topology of a SAS network configured from a plurality of SAS expanders is advantageous in that numerous storage apparatuses can be attached inexpensively with a single topology in comparison to a fibre channel arbitrated loop. The specification of U.S. Pat. No. 6,886,051 (Patent Document 4) and Non-Patent Document 1 disclose a discover process as a process for the SAS controller (initiator) to discover for the topology of the tree-structure switch network using the SAS expander.

Further, Rob Elliott, SAS-2 Multiplexing (Draft) Revison7, 6 Nov. 2006, http://www.t10.org/ftp/t10/document.05/05-381r7.pdf (as of March 2007) (Non-Patent Document 2) discloses multiplexing of transferring a plurality of data simultaneously with time-division multiplexing a plurality of logical links to a physical link of SAS. With this technology, when the maximum physical link rate of the SAS initiator is a higher link rate than the maximum physical link rate (transfer rate) of the storage apparatus, one high link rate physical link on the side of the SAS initiator is partitioned so that the input and output of data with two low link rate storage apparatuses can be controlled.

In a disk array subsystem adopting SAS as the interface for connecting a plurality of storage apparatuses (disk drives, etc.), there may be a configuration where a high link rate storage apparatus or expander adopting state-of-the-art SAS interface technology and a medium link rate or low link rate storage apparatus or expander adopting conventional SAS interface coexist. In this kind of connection configuration, storage apparatuses, expanders and SAS initiators having different maximum physical link rates will exist in the backend network of the disk array subsystem.

By employing the multiplexing disclosed in Non-Patent Document 2, when the maximum physical link rate of the SAS initiator is a higher link rate than the maximum physical link rate of the storage apparatus, one high link rate physical link on the side of the SAS initiator is partitioned so that the input and output of data with two low link rate storage apparatuses can be controlled. When the maximum physical link rates of storage apparatuses and the like are all of the same value, by setting the maximum logical link rate of all logical links to be the same as the maximum physical link rate of the storage apparatuses, the system performance of the overall backend can be utilized to the maximum extent.

Nevertheless, according to Non-Patent Document 2, in order to set the multiplexing, it is necessary to fix the number of logical links in the physical link during the link reset sequence as the initialization routine for establishing the physical link. Since the setting of the multiplexing is fixed at the time of initialization, the number of logical links configured in the physical link cannot be dynamically changed.

As described above, as a result of the restriction of not being able to dynamically set the multiplexing, when the maximum physical link rates of storage apparatuses and the like coexist, for instance, at 1.5 [Gbps], 3 [Gbps], and 6 [Gbps], in a case where the multiplexing is set to a slow storage apparatus of 1.5 [Gbps] to coincide with the maximum logical link rate, the logical link rate that can actually be input and output by a storage apparatus having a maximum physical link rate of 3 [Gbps] or 6 [Gbps] will be restricted to the maximum logical link rate of 1.5 [Gbps] set during the setting of the multiplexing. In the case of the same coexistence conditions as above, when the multiplexing is set to a high link rate storage apparatus of 6 [Gbps] to coincide with the maximum logical link rate of the logical link, a storage apparatus having a low maximum physical link rate of 1.5 [Gbps] or 3 [Gbps] will not be able to perform multiplexing and will not be able to use the bandwidth of the high link rate physical link of 6 [Gbps]. Thus, there is a restriction in that it is not possible to perform input/output from four storage apparatuses simultaneously with the four logical links set at a logical link rate of 1.5 [Gbps].

Accordingly, since the setting of the multiplexing is fixed, in a disk array subsystem attached to a plurality of storage apparatuses, it is not possible to set the backend network of the storage apparatuses to an optimal system performance when a plurality of maximum physical link rates of storage apparatuses coexist. Thus, there is a problem in that it is not possible to simultaneously utilize the maximum throughput performance of the backend of the disk array subsystem and the maximum physical link rate of the storage apparatuses.

SUMMARY OF THE INVENTION

The present invention was made in view of the foregoing points. Thus, an object of the present invention is to propose a disk array subsystem and its control method capable of optimizing the system performance of a disk array subsystem consolidated with storage apparatuses or control units having different maximum physical link rates.

In order to achieve the foregoing object, the present invention provides disk array subsystem having a network that connects a plurality of storage apparatuses. This disk array subsystem comprises a data input/output unit for inputting and outputting data in and from the network, a connecting unit for connecting the data input/output unit and the storage apparatuses, and a control unit for controlling the input and output of data in and from the network. The control unit comprises a logical link setting unit for zoning at least one or more physical links among a plurality of physical links for inputting and outputting data between the data input/output unit and the connecting unit, or between the connecting unit and the connecting unit into at least one or more logical links, and setting a plurality of logical links to one physical link; and a link unit for simultaneously multiplexing the data to a plurality of the logical links set with the logical link setting unit, and linking the data to the physical link.

The present invention further provides a control method of a disk array subsystem having a network that connects a plurality of storage apparatuses. This control method of a disk array subsystem comprises a first step of zoning at least one or more physical links among a plurality of physical links for inputting and outputting data between the data input/output unit that input and outputs data in an from the network and the connecting unit that connects the data input/output unit and the storage apparatuses, or between the connecting unit and the connecting unit into at least one or more logical links, and setting a plurality of logical links to one physical link; and a second step of simultaneously multiplexing the data to a plurality of the logical links set at the first step, and linking the data to the physical link.

Therefore, in a disk array subsystem consolidated with control units and storage apparatuses having different maximum physical link rates on a single network, it is possible to control the input and output of data using the maximum physical link rate between the data input/output unit and a plurality of storage apparatuses while maintaining the data link of the maximum physical link rate of the storage apparatuses. Thus, it is possible to input and output data where the network performance of the storage apparatus will be the maximum throughput performance of the storage apparatuses, and a storage apparatus having a high link rate as the maximum physical link rate will be able to input and output data with maximum throughput performance.

According to the present invention, it is possible to realize a disk array subsystem and its control method capable of optimizing the system performance of a disk array subsystem consolidated with storage apparatuses or control units having different maximum physical link rates.

DETAILED DESCRIPTION OF THE DRAWINGS

An embodiment of the present invention is now explained in detail with reference to the attached drawings.

(1) Configuration of Storage System 1

Figure 1:
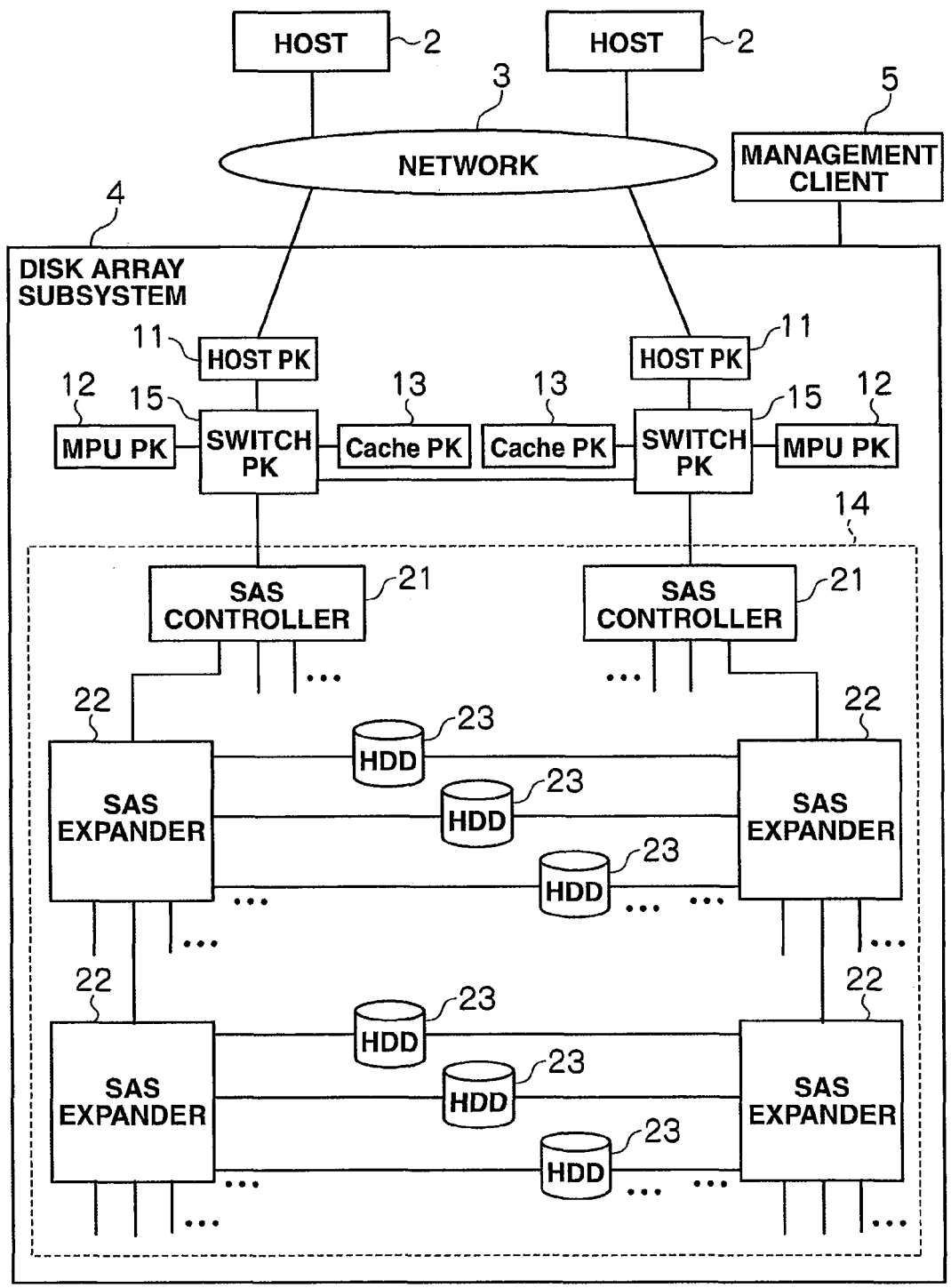
FIG. 1 is an internal block diagram of a storage system.

FIG. 1 is a configuration diagram of a storage system 1. The storage system 1 is configured by a host 2 being attached to a disk array subsystem 4 via a network. Further, the disk array subsystem 4 is attached to a management client 5 via a prescribed communication path.

The host 2 is a computer device comprising information processing resources such as a CPU (Central Processing Unit) and a memory, and, for example, is configured from a personal computer, a workstation, a mainframe or the like. Further, the host 2 comprises an information input device (not shown) such as a keyboard, a switch, a pointing device or a microphone, and an information output device (not shown) such as a monitor display or a speaker.

The network 3, for example, is configured from a SAN (Storage Area Network), a LAN (Local Area Network), Internet, a public line or a dedicated line. Communication between the host 2 and the disk array subsystem 4 via the network 3 is conducted, for instance, according to a fibre channel protocol when the network 3 is a SAN, and according to a TCP/IP (Transmission Control Protocol/Internet Protocol) protocol when the network 3 is a LAN.

The disk array subsystem 4 comprises a host package (Host PK) 11, an MPU (Micro Processing Unit) package (MPU PK) 12, a cache package (Cache PK) 13, and a backend 14, and these are respectively attached to a switch package (Switch PK) 15. The disk array subsystem 4 is configured redundantly.

The host package 11 is a package including an interface controller such as a fibre channel or iSCSI (internet Small Computer System Interface) as the interface (I/F) with the host 2. The host package 11 is attached to a plurality of hosts 2 via the network 3. Further, the host package 11 is attached to the management client 5, and controls the management client 5 to create a RAID group (Redundant Array of Independent/Inexpensive Disks Group) and the like.

Figure 2:
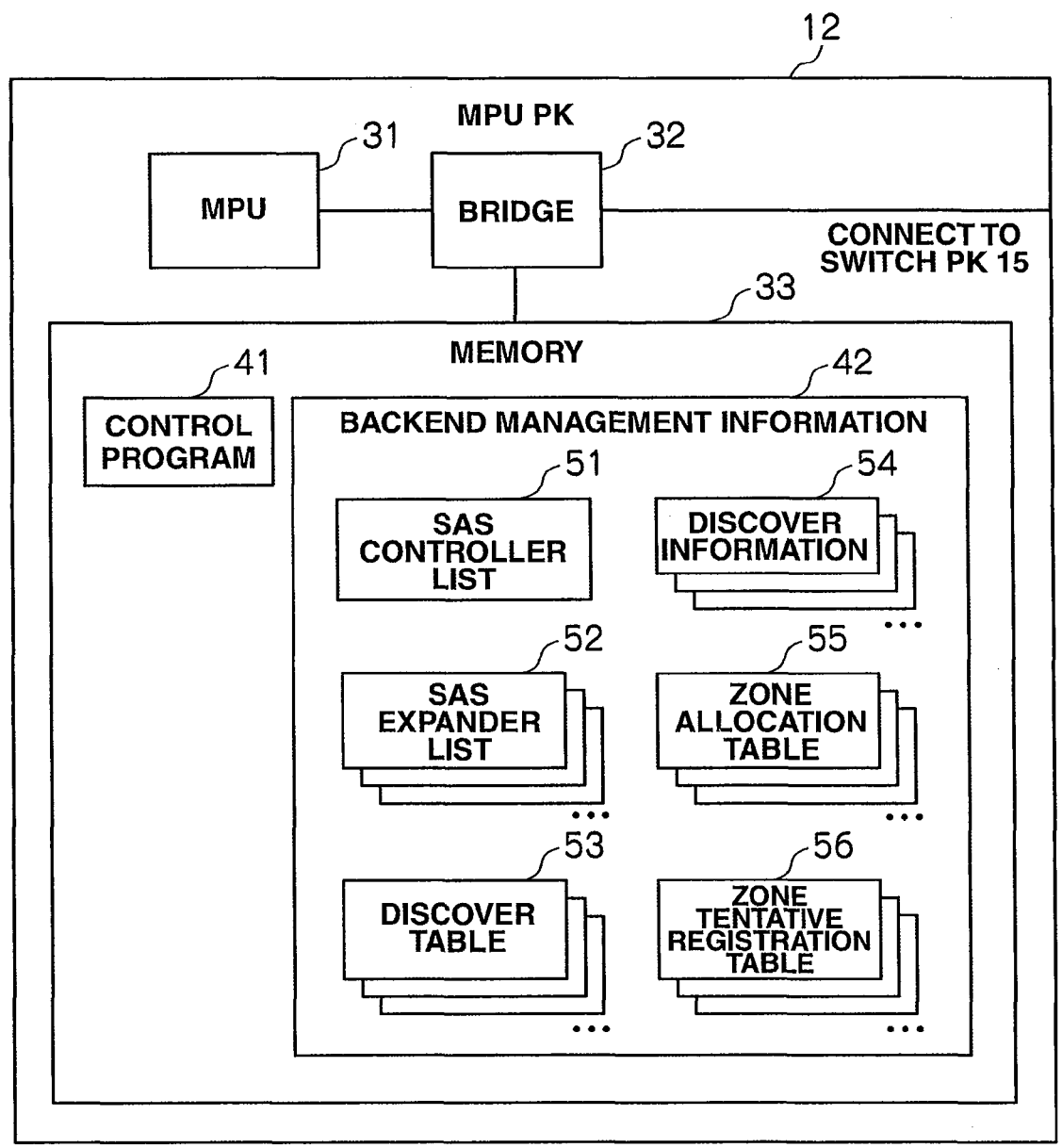
FIG. 2 is an internal block diagram of an MPU package.

The MPU package 12 is a package for controlling the disk array subsystem 4 (to be described in detail later with reference to FIG. 2).

The cache package 13 is a package including a cache memory as the primary storage area of user data to be stored in the disk array subsystem 4, and a cache controller for connecting the cache memory and the switch package 15.

The backend 14 is a package including an interface controller for controlling a plurality of storage apparatuses 23 in the disk array subsystem 4. The backend 14 comprises a plurality of SAS controllers 21 as the interface controller, and is attached to the switch package 15. The SAS controllers 21 are attached to a plurality of storage apparatuses (HDD: Hard Disk Drives) 23 via the SAS expander 22 (to be described in detail later with reference to FIG. 4).

(2) Configuration of MPU Package 12

Configuration of the MPU package 12 is now explained with reference to FIG. 2. FIG. 2 is a block diagram showing the internal configuration of the MPU package 12. The MPU package 12 connects the MPU 31 to a bridge 32. The bridge 32 is similarly attached to a memory 33 and the switch package 15.

The memory 33 stores a control program 41 for controlling the disk array subsystem 4, and backend management information 42. The backend management information 42 stores a list 51 of SAS controllers managing the SAS expanders 22 included in the backend 14, a list 52 of a plurality of SAS expanders storing information on the SAS expander 22 list, a discover table 53 for storing information on the storage apparatus 23 and the SAS expander 22 attached to the SAS expander 22, discover information 54, a zone allocation table 55 for storing information on zoning the backend 14, and a zone tentative registration table 56 for conducting tentative registration upon allocating a zone.

(3) Backend Management Information 42

Figure 3:
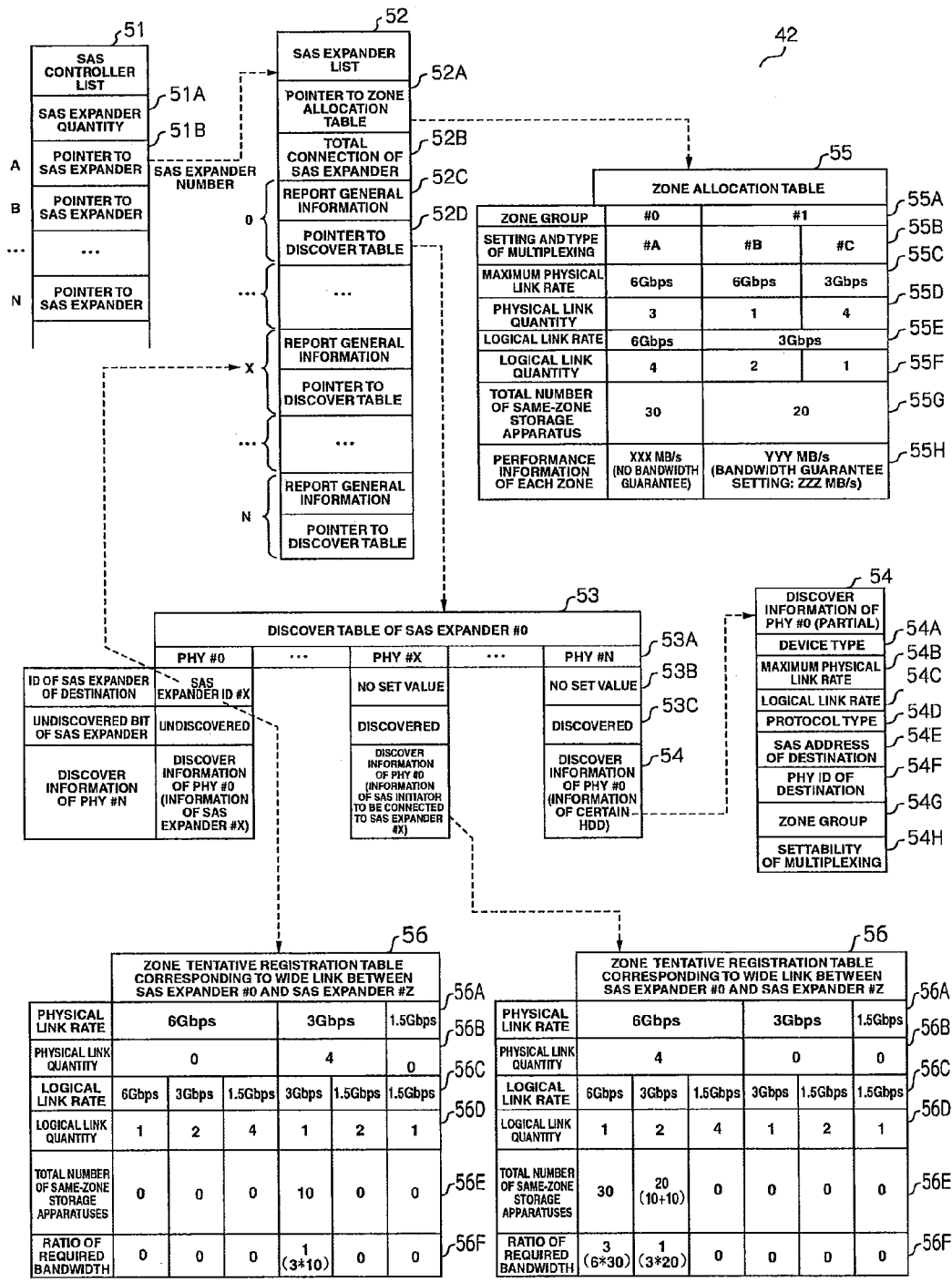
FIG. 3 is a conceptual diagram of backend management information.

Details concerning the backend management information 42 are now explained with reference to FIG. 3. FIG. 3 is a diagram explaining the entry of various tables configuring the backend management information 42.

The SAS controller list 51 comprises a SAS expander quantity field 51A for storing the quantity of SAS expanders 22 configuring the backend 14 managed by the SAS controller 21 with a backend 14, and a pointer to an expander list field 51B for storing pointers to the expander list 52 described later.

The SAS expander list 52 stores information on the SAS expander 22 attached to the SAS controller 21, and on the SAS expander 22 attached therebelow. The SAS expander list 52 comprises a pointer to a zone allocation table field 52A for storing pointers to the zone allocation table 55 described later, and a total connection of SAS expander field 52B for storing the total number of connections of the SAS expander 22. Further, the SAS expander list 52 comprises a report general information field 52C for storing response information of a report general command as basic information of the SAS expander 22 to each of the attached SAS expanders 22, and a pointer to a discover table field 52D for storing points to the discover table 53 described later.

The discover table 53 stores discover information 54 as information of the opponent's physical phy 61 to be attached to each physical phy 61 stored in the physical phy number field 53A storing the number (PHY ID) of each physical phy (PHY) 61 (described later) of the SAS expander 22. Further, the discover table 53 comprises, correspondence with each physical phy 61 of each physical phy number field 53A, an ID field 53B of the destination expander storing the ID of the destination SAS expander 22, an undiscovered bit field 53C storing undiscovered bits, and discover information 54 of the opponent's physical phy 61 to be attached to each physical phy 61 of each physical phy number field 53A. The destination expander ID field 53B is a field that becomes valid when the SAS expander 22 is attached to the destination of the physical phy 61, and indicates the report general information field 52C and the pointer to discover table field 52D of the subsequently attached SAS expander 22. When the physical phy 61 is the storage apparatus 23, the destination expander ID field 53B is invalid. The undiscovered bit field 53C is used in a topology resolution sequence known as the discover process described later.

The discover information 54 stores information prescribed under SAS standards. The discover information 54 comprises a device type field 54A for storing information that differentiates the SAS expander 22 and the storage apparatus 23, a maximum physical link rate field 54B for storing the maximum physical link rate described later, a logical link rate field 54C storing the logical link rate described later, a protocol type field 54D for storing the protocol type, a SAS address field 54E of the destination storing the address (WWN: World Wide Name) of the destination SAS, a physical phy number field 54F for storing the destination physical phy number (PHY ID), a zone group field 54G for storing a zone group described later, and a multiplexing capability field 54H for storing the capability of the multiplexing described later.

The zone allocation table 55 is a table for associating the correspondence and zoning of the logical link corresponding to the physical link described later upon zoning the overall topology described later. The zone allocation table 55 comprises a zone group ID field 55A for storing a zone group ID, a multiplexing setting type field 55B for storing the type of multiplexing setting, a maximum physical link rate field 55C, a physical link count field 55D for storing the number of physical links, a logical link rate field 55E, a logical link count field 55F for storing the number of logical links, a total number of same-zone storage apparatuses field 55G for storing the total number of storage apparatuses 23 included in the same zone group, and a performance information of each zone field 55H for storing the performance information of each zone group.

The zone tentative registration table 56 is a table for tentatively retaining information for collecting information to create the zone allocation table 55 during the execution of the discover process described later. The zone tentative registration table 56 is a table defined in the SAS controller 21 and the SAS expander 22, respectively. Further, the control program 41 newly creates a zone tentative registration table 56 each time a new SAS expander 22 is discovered during the execution of the discover process described later. The zone tentative registration table 56 comprises a physical link rate field 56A, a physical link count field 56B, a logical link rate field 56C, a logical link count field 56D, a total number of same-zone storage apparatuses field 56E, and a necessary bandwidth ratio field 56F for storing the ratio of the bandwidth required in the zone tentative registration table 56.

(4) Configuration of Backend 14

Configuration of the backend 14 is now explained with reference to FIG. 4. The backend 14 is configured from a SAS controller 21, a plurality of SAS expanders 22, and a plurality of storage apparatuses 23. One or more SAS controllers 21 may be used.

There are a plurality of types of SAS expanders 22, and a high link rate SAS expander 22A has a high link rate and is compatible with multiplexing, and a low link rate SAS expander 22B has a low link rate and is compatible with multiplexing. Since the high link rate SAS expander 22A directly attached from the SAS controller 21 corresponds to the root of a tree structure beginning with the MPU package 12 of the disk array subsystem 4, this is sometimes hereinafter referred to as a high link rate SAS expander 22A of ROOT.

In this embodiment, although a storage apparatus 23 is attached to the high link rate SAS expander 22A of ROOT, such storage apparatus 23 does not have to be attached. A plurality of storage apparatuses 23 are attached to another SAS expander 22; namely, a storage apparatus 23A having a maximum physical link rate that is a high link rate (HDD (high link rate)) (high link rate storage apparatus 23A), and a storage apparatus 23B having a maximum physical link rate that is a low link rate storage apparatus (HDD (low link rate)) (low link rate storage apparatus 23B). The SAS expanders 22 can be attached in a tree structure. The connection configuration referred to as a "loop" capable of reaching one SAS expander 22 via a plurality of different SAS expanders 22 is not approved under the SAS standards.

Figure 4:
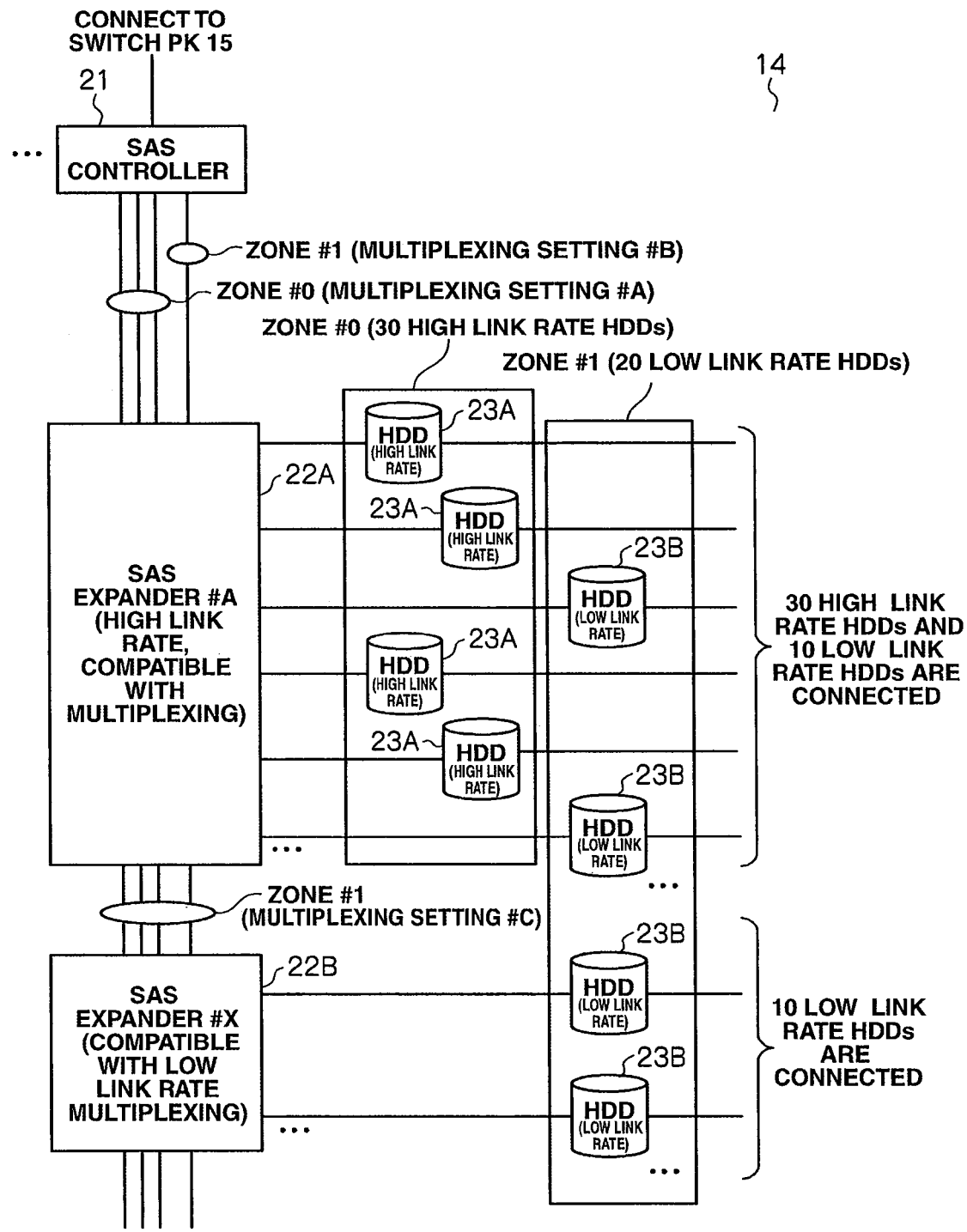
FIG. 4 is a block diagram showing the configuration of a backend.

In the embodiment illustrated in FIG. 4, thirty high link rate storage apparatuses 23A and ten low link rate storage apparatuses 23B are respectively attached to the high link rate SAS expander 22A, and a low link rate SAS expander 22B is also attached thereto. Ten low link rate storage apparatuses 23B are attached to the low link rate SAS expander 22B. An SAS expander 22 is not attached to the downstream of the low link rate SAS expander 22B.

(5) Serial Attached SCSI

Figure 5:
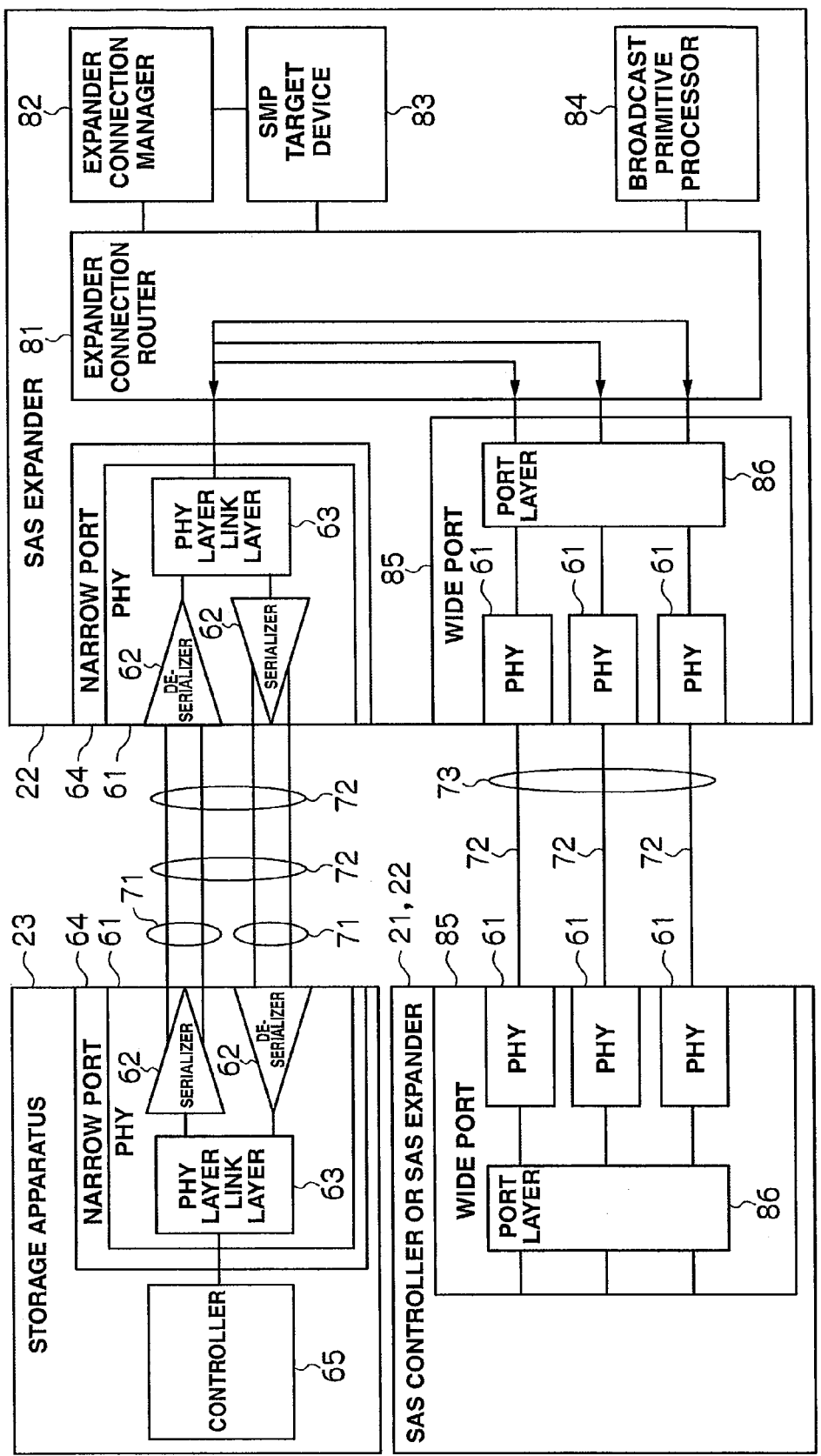
FIG. 5 is a conceptual diagram showing the relationship of a physical phy, physical link, port, and logical link of SAS.

The relationship of the physical phy, physical link, port, and logical link of SAS is now explained with reference to FIG. 5. The SAS controller 21, the SAS expander 22 and the storage apparatus 23 comprise one or more physical phys 61. The physical phy 61 comprises a SerDes (Serializer/DeSerializer) 62, and a PHY layer LINK layer 63. The connection of two physical phys 61 with an interactive differential signal 71 is referred to as a physical link 72. Since the storage apparatus 23 and the SAS expander 22 of FIG. 5 are attached with one physical link 72, this physical link 72 is referred to as a narrow link. Further, a port configured from a narrow link is referred to as a narrow port 64.

The SAS expander 22 comprises two or more physical phys 61, an ECR (Expander Connection Router) 81, an ECM (Expander Connection Manager) 82, an SMP target device (Serial Management Protocol Target Device) 83, and a BPP (Broadcast Primitive Processor) 84. The ECR 81 is a switch mechanism configured from a non-blocking switch or the like that passes from the physical phy 61 to another physical phy 61. The ECM 82 comprises a routing table for controlling the ECR 81, and a mechanism for controlling the zoning described later. The SMP target device 83 is a device built in the SAS expander 22 for controlling the ECM 82 from the SAS controller 21. BPP 84 is a mechanism for monitoring the physical phy 61 of the SAS expander 22, insertion and removal of the physical phy 61 attached to the physical phy 61, and detecting the link up/link down of the physical link 72 and notifying this with a broadcast signal to the SAS controller 21.

It is possible to bundle a plurality of physical links 72 between the SAS expander 22 and the SAS expander attached that SAS expander 22, or between the SAS controller 21 and the SAS expander 22 to configure a wide link 73. The wide link 73 is technology that enables the input and output of data from the same SAS controller 21 to a plurality of storage apparatuses 23 while simultaneously using a plurality of physical links 72. Further, a port configured with a wide link 73 is referred to as a wide port 85. Moreover, since the wide port 85 has a plurality of physical phys 61, it comprises a port 86 attached to a plurality of physical phys 61.

Incidentally, the storage apparatus 23 comprises a controller 65 for controlling the storage apparatus 23. Further, the port 86 of the SAS controller 21 is attached to the switch package 15.

(6) SAS Multiplexing

Multiplexing in the physical link 72 of SAS is now explained with reference to FIG. 6 to FIG. 9.

Foremost, rate matching (control for matching the link rate) of SAS is explained with reference to FIG. 6 and FIG. 7. Under the SAS standards, in order to avoid the complexity of protocol, rate matching is performed with a simple method. Incidentally, the maximum physical link rate of the physical link 72 between the high link rate storage apparatus 23A and the high link rate SAS expander 22A is a high link rate in comparison to the maximum physical link rate of the physical link 72 between the low link rate storage apparatus 23B and the high link rate SAS expander 22A.

Figure 6:
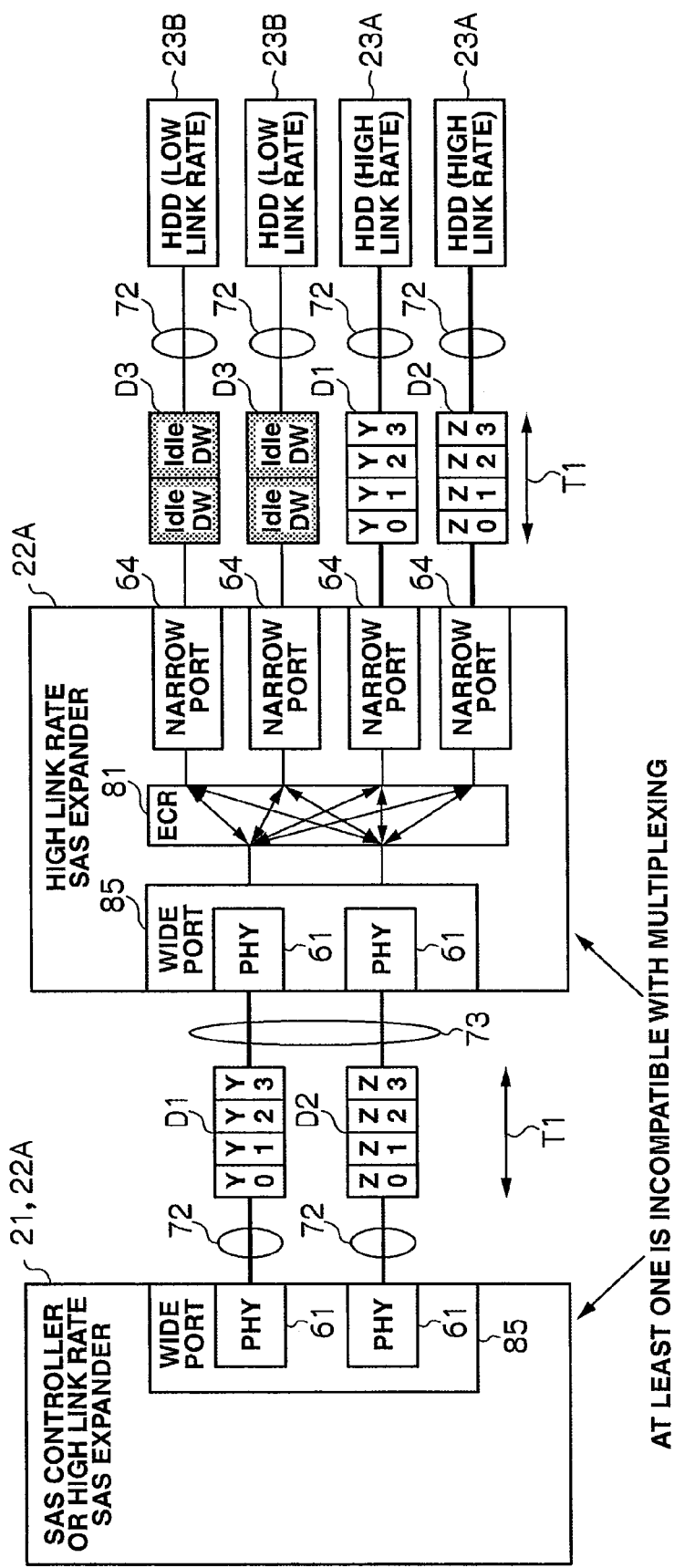
FIG. 6 is a conceptual diagram showing multiplexing in a physical link of SAS.

FIG. 6 is a diagram showing a case of matching the maximum physical link rate of the physical link 72 between the high link rate storage apparatus 23A and the high link rate SAS expander 22A, and the maximum physical link rate of the physical link 72 between the SAS controller 21 and the high link rate SAS expander 22A. The data link unit is hereinafter indicated as DW (Double Word=32 bit).

In the foregoing case, between the high link rate SAS expander 22A and the high link rate storage apparatus 23A, 4DW data D1 of Y0, Y1, Y2, Y3 and 4DW data D2 of Z0, Z1, Z2, Z3 are linked at time T1. Further, between the SAS controller 21 and the high link rate SAS expander 22A, upon selecting one of the unattached physical links 72 of the wide link 73 in the wide port 85, 4DW data D1 of Y0, Y1, Y2, Y3 and 4DW data D2 of Z0, Z1, Z2, Z3 are linked at time T1.

Incidentally, in FIG. 6, since data is not being input to or output from the low link rate storage apparatus 23B, 2DW data D3 as idle DW is linked between the high link rate SAS expander 22A and the low link rate storage apparatus 23B.

Figure 7:
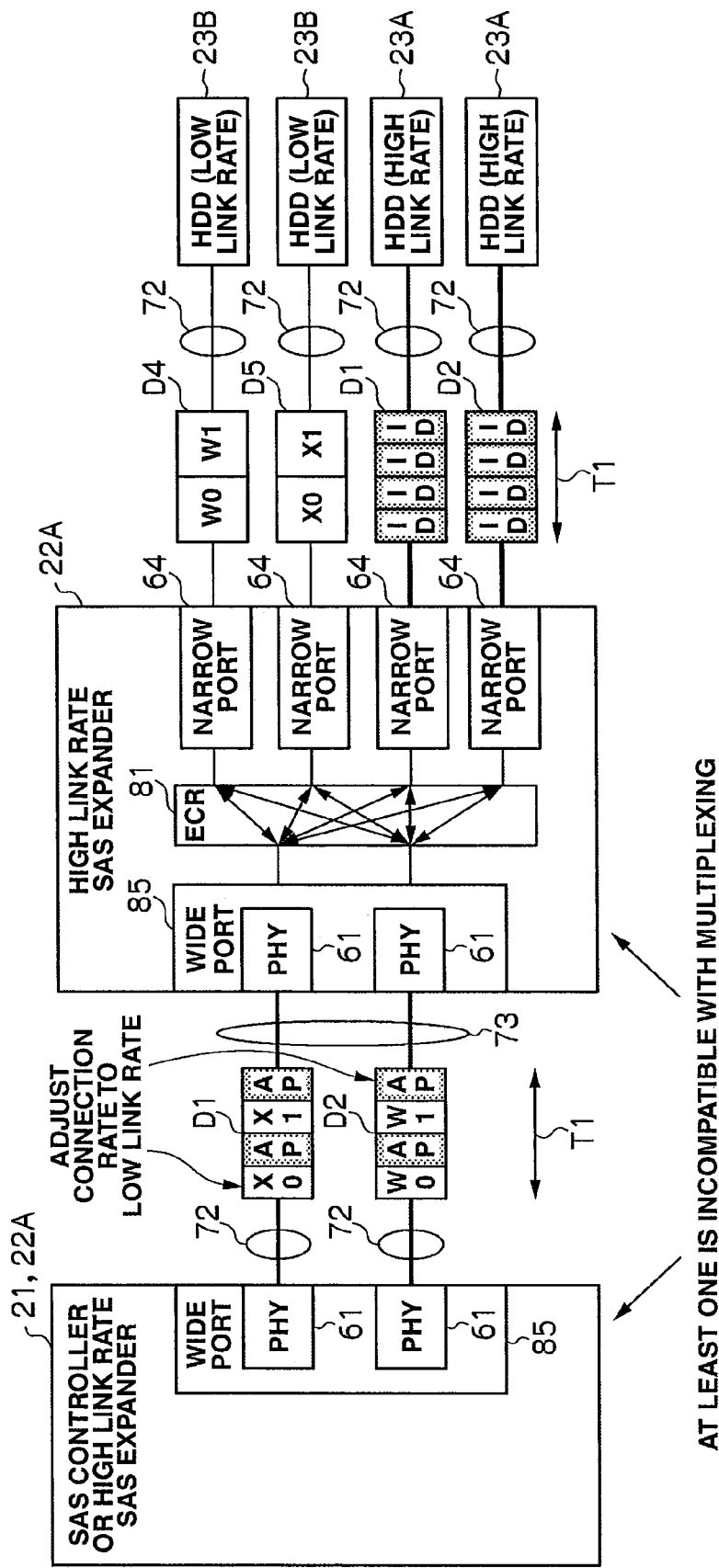
FIG. 7 is a conceptual diagram showing multiplexing in a physical link of SAS.

FIG. 7 is a diagram showing a case where the maximum physical link rate of the physical link 72 between the low link rate storage apparatus 23B and the high link rate SAS expander 22A and the maximum physical link rate of the physical link 72 between the SAS controller 21 and the high link rate SAS expander 22A do not match, and the maximum physical link rate of the physical link 72 between the SAS controller 21 and the high link rate SAS expander 22A is of a higher link rate.

In the foregoing case, between the high link rate SAS expander 22A and the low link rate storage apparatus 23B, 2DW data D4 of W0, W1 and 2DW data D5 of X0, X1 are linked at time T1.

Here, since the maximum physical link rate of the physical link 72 between the low link rate storage apparatus 23B and the high link rate SAS expander 22A and the maximum physical link rate of the physical link 72 between the SAS controller 21 and the high link rate SAS expander 22A do not match, it is necessary adjust the connection rate to the link rate of the storage apparatus 23B, which has a maximum physical link rate of a low link rate, between the SAS controller 21 and the high link rate SAS expander 22A. Thus, by converting the 4DW data D6 of W0, AP (ALIGN Primitive), W1, AP in the physical link 72 between the SAS controller 21 and the high link rate SAS expander 22A to match time T1 of linking the data D4 of W0, W1, the data volume to be linked during the same time T1 is made to coincide with the 2DW data D4 of W0, W1. Incidentally, AP is correction data to be used in the rate matching, and AP is dropped on the receiving side so as to correct a data sequence.

Similarly, since the maximum physical link rate of the physical link 72 between the low link rate storage apparatus 23B and the high link rate SAS expander 22A and the maximum physical link rate of the physical link 72 between the SAS controller 21 and the high link rate SAS expander 22A do not match, it is necessary adjust the connection rate to the link rate of the storage apparatus 23B, which has a maximum physical link rate of a low link rate, between the SAS controller 21 and the high link rate SAS expander 22A. Thus, by converting the 4DW data D7 of X0, AP, X1, AP in the physical link 72 between the SAS controller 21 and the high link rate SAS expander 22A to match time T1 of linking the data D5 of X0, X1, the data volume to be linked during the same time T1 is made to coincide with the 2DW data D5 of X0, X1.

Incidentally, in FIG. 7, since data is not being input to or output from the high link rate storage apparatus 23A, data D8 as idle DW is linked between the high link rate SAS expander 22A and the high link rate storage apparatus 23A.

Nevertheless, in a topology where a plurality of storage apparatuses 23 having different maximum physical link rates are attached as in the data link depicted in FIG. 7, it is evident that the utilization efficiency of the physical link 72 between the SAS controller 21 and the high link rate SAS expander 22A will be 50%. Thus, there will be a restriction in that the maximum performance of the disk array subsystem 4 cannot be utilized.

Figure 8:
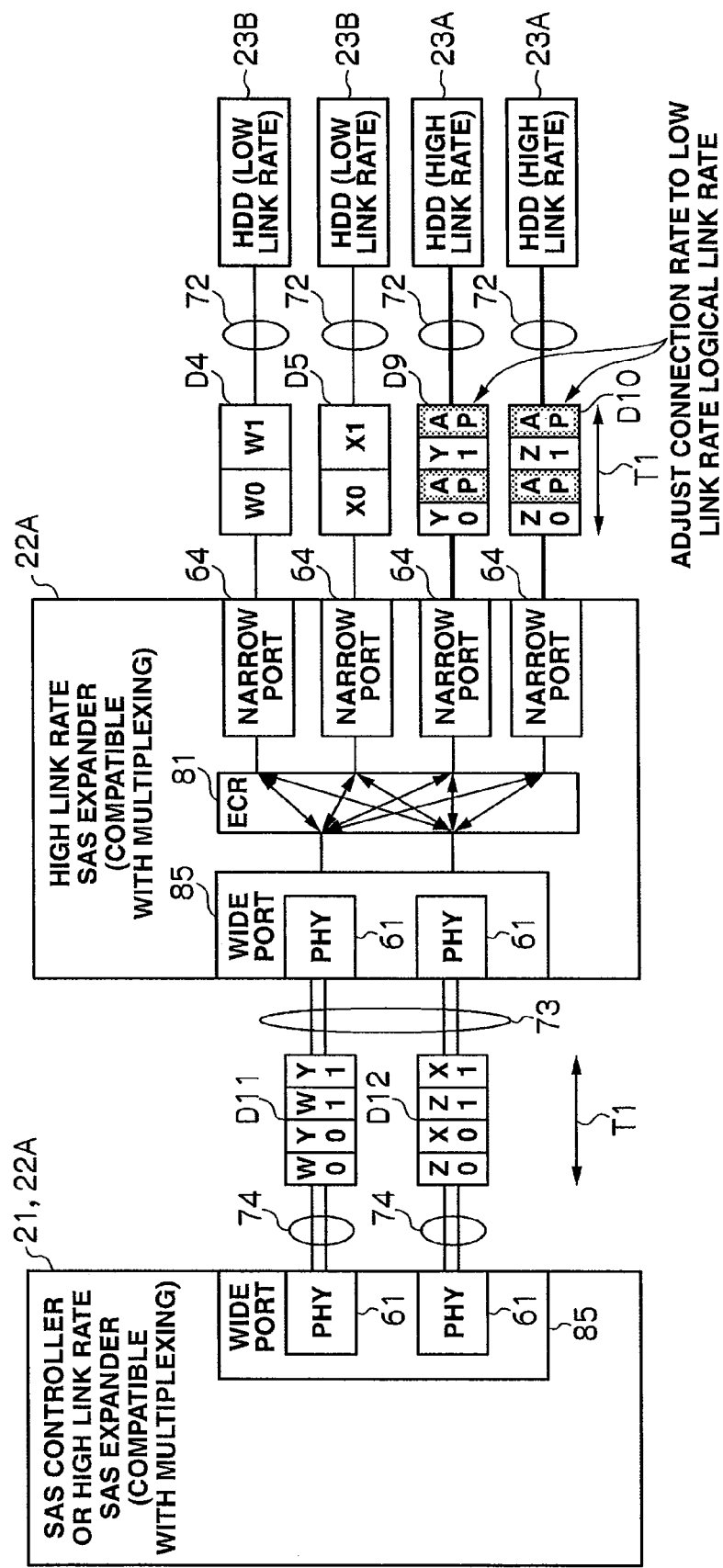
FIG. 8 is a conceptual diagram showing multiplexing in a physical link of SAS.

To overcome this drawback, FIG. 8 shows a case of using multiplexing to increase the utilization efficiency of the physical link 72 between the SAS controller 21 and the high link rate SAS expander 22A to 100%. Multiplexing and logical links are now explained with reference to FIG. 8.

FIG. 8 is a diagram showing a case where the maximum physical link rate of the physical link 72 between the high link rate storage apparatus 23A and the multiplexing-capable high link rate SAS expander 22A and the maximum physical link rate of the physical link 72 between the SAS controller 21 and the multiplexing-capable high link rate SAS expander 22A are matching. Further, FIG. 8 also shows a case where the maximum physical link rate of the physical link 72 between the low link rate storage apparatus 23B and the high link rate SAS expander 22A and the maximum physical link rate of the physical link 72 between the SAS controller 21 and the high link rate SAS expander 22A do not match, and the maximum physical link rate of the physical link 72 between the SAS controller 21 and the high link rate SAS expander 22A is of a higher link rate.

In the foregoing case, the physical link between the high link rate SAS expander 22A and the low link rate storage apparatus 23B is partitioned into two logical links referred to as virtual physical links. Multiplexing is realized by time-division multiplexing the data sent from two different transmission source/transmission destination using the logical link.

According to FIG. 8, between the SAS controller 21 and the high link rate SAS expander 22A, two physical links of the wide link 73 in the wide port 85 are partitioned into four logical links 74.

Here, at the physical link 72 between the high link rate SAS expander 22A and the low link rate storage apparatus 23B, 2DW data D4 of W0, W1 and 2DW data D5 of X0, X1 are linked at time T1.

At the logical link 74 between the SAS controller 21 and the high link rate SAS expander 22A, an empty logical link 74 is selected among the four logical links 74, and 4DW data D11 of W0, Y0, W1, Y1 are time-division multiplexed at time T1 (first logical link W0, Y0, second logical link W1, Y1).

Here, since the maximum physical link rate of the physical link 72 between the SAS controller 21 and the high link rate SAS expander 22A and the maximum physical link rate of the physical link 72 between the high link rate storage apparatus 23A and the high link rate SAS expander 22A do not match, it is necessary to adjust the connection rate to the low logical link rate between the high link rate storage apparatus 23A and the high link rate SAS expander 22A.

In other words, between the high link rate storage apparatus 23A and the high link rate SAS expander 22A, by converting the 4DW data D10 of Y0, AP, Y1, AP in the physical link 72 between the high link rate storage apparatus 23A and the high link rate SAS expander 22A to match time T1 of linking the 2DW data of Y0, Y1 among the data D11, the data volume to be linked during the same time T1 is made to coincide with the 2DW data of Y0, Y1.

Further, at the logical link 74 between the SAS controller 21 and the high link rate SAS expander 22A, an empty logical link 74 is selected among the four logical links 74, and 4DW data D12 of X0, Z0, X1, Z1 are time-division multiplexed at time T1 (third logical link X0, Z0, fourth logical link X1, Z1).

Here, it is necessary to also perform rate matching between the high link rate storage apparatus 23A and the high link rate SAS expander 22A as in the case described above. Thus, by converting the 4DW data D10 of Z0, AP, Z1, AP in the physical link 72 between the high link rate storage apparatus 23A and the high link rate SAS expander 22A to match time T1 of linking the 2DW data of Z0, Z1 among the data D12, the data volume to be linked during the same time T1 is made to coincide with the 2DW data of Y0, Y1.

Like this, the problem of AP wasting 50% of the bandwidth arising in FIG. 7 can be resolved with FIG. 8, but then this entails another problem. In other words, in FIG. 6, the same link rate of the maximum physical link rate could be used for the link rate during connection in the linking of the high link rate storage apparatus 23A, and 4DW data can be linked during time T1. In FIG. 7, however, the connection rate of the high link rate storage apparatus 23A will become the logical link rate of the logical link 74 configured from the physical link 72 between the SAS controller 21 and the high link rate SAS expander 22A, and the maximum physical link rate of the high link rate storage apparatus 23A will decrease to ½.

Thus, the connection rate of the high link rate storage apparatus 23A will be ½ of the maximum physical link rate, and the data link volume that can be linked during time T1 will be 2DW. Therefore, even when connecting a high link rate storage apparatus 23A, the connection rate needs to be adjusted to a level that is equivalent to the low logical link rate of the low link rate storage apparatus 23B, and there is a problem in that the advantage of connecting a high link rate storage apparatus 23A will be lost in terms of performance.

Thus, the present invention aims to maintain the utilization efficiency of the physical link 72 between the SAS controller 21 and the high link rate SAS expander 22A at 100%, and to keep the maximum logical link rate of the high link rate storage apparatus 23A at the same level as the maximum physical link rate. A solution using multiplexing and zoning of the physical link 72 configuring the wide link 73 in the wide port 85 is now explained with reference to FIG. 9.

Figure 9:
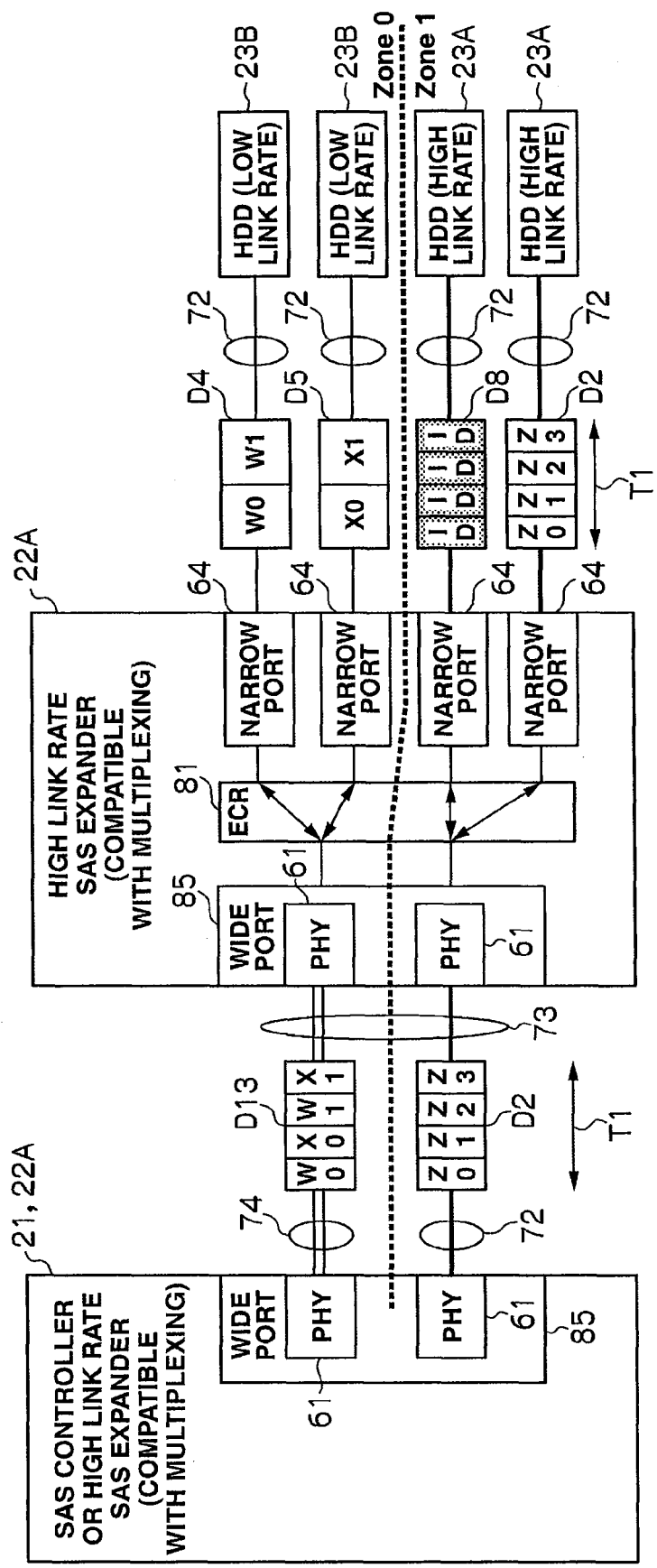
FIG. 9 is a conceptual diagram showing multiplexing in a physical link of SAS.

FIG. 9 has the same connection configuration as FIG. 8. Here, among the two physical links 72 configuring the wide link 73 in the wide port 85 connecting the SAS controller 21 and the high link rate SAS expander 22A, one of the physical links 72 is partitioned into two logical links 72 and made to be compatible with multiplexing. Multiplexing is not set to the other physical link 72. Further, a logical link 74 and a physical link 72 configuring the wide link 73 and which respectively have different multiplexing settings are subject to zoning in order to configure two zone groups. In other words, with the present embodiment, one wide port 73 is partitioned into a plurality of zones, and the multiplexing setting is changed for each zone.

In the foregoing case, the zone group including the logical link 74 to which multiplexing was set to the physical link 72 includes the low link rate storage apparatus 23B, and the zone group including the physical link 72 with no multiplexing setting includes the high link rate storage apparatus 23A. The ECM 82 of the high link rate SAS expander 22A manages routing information and zone group information, and prohibits the ECR 81 from accessing paths that go across zone groups.

Thereby, the two low link rate storage apparatuses 23B link data via the path of the logical link 74 set with multiplexing among the two physical links configuring the wide link 73 in the wide port 85. Further, the two high link rate storage apparatuses 23A link data via the physical link 72. Therefore, regarding the data D4 and data D5 of the two low link rate storage apparatuses 23B, 4DW data D13 of W0, X0, W1, X1 can be time-division multiplexed at time T1 in the logical link 74. Moreover, the high link rate storage apparatus 23A is able to link the 4DW data D2 of Z0, Z1, Z2, Z3 at time T1, and a high link rate data link can thereby be performed.

(7) Outline of Sequence

Figure 10:
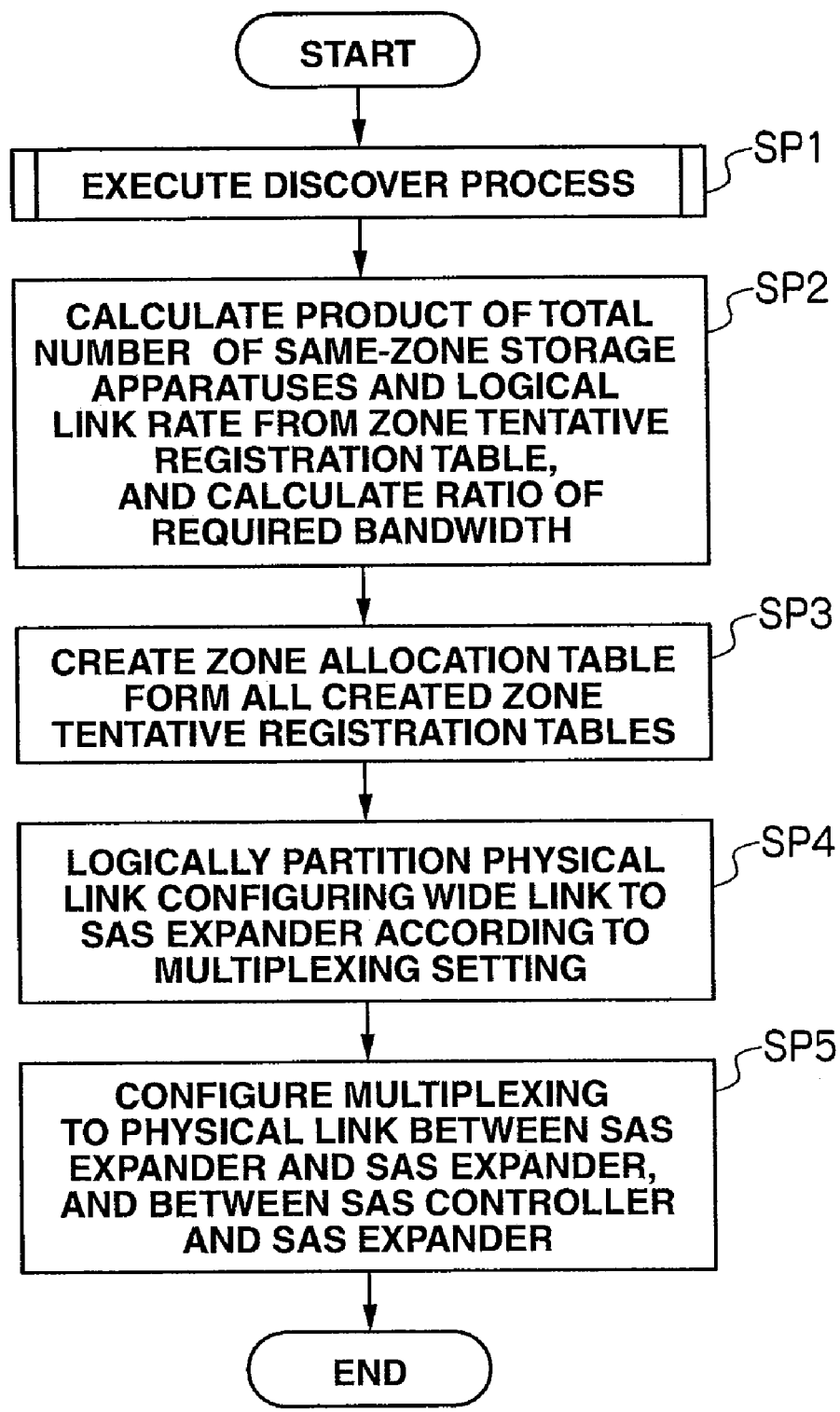
FIG. 10 is a flowchart showing the sequence of discover processing for initializing the topology of the backend.

The control sequence for realizing the concept described in FIG. 9 is now explained with reference to FIG. 10. FIG. 10 is a diagram showing the discover process sequence for initializing the topology of the backend 14.

In the beginning, when the MPU package 12 of the disk array subsystem 4 detects a topology change event via the SAS controller 21, it starts the sequence illustrated in FIG. 10. Foremost, the MPU package 12 executes the discover process, which is a sequence for resolving the SAS topology, and then proceeds to SP2 (SP1). Details concerning SP1 will be described later with reference to FIG. 8.

The MPU package 12 calculates the product of the number of HDDs of the total number of same-zone storage apparatuses field 57E and the logical link rate of the logical link rate field 56C from the zone tentative registration table 56 created at SP1, calculates the ratio of the bandwidth required in the zone tentative registration table 56, and stores this information in the necessary bandwidth ratio field 56F (SP2). In this embodiment, the connection configuration of FIG. 4 is shown, and the necessary bandwidth ratio of the logical link rate of 6 [Gbps] and the logical link rate of 3 [Gbps] is 3:1 (6 [Gbps]×30 [apparatuses]=180, 3 [Gbps]×20 [apparatuses] =60, and 180:60=3:1). Similarly, the ratio between the high link rate SAS expander 22A and the low link rate SAS expander 22B only has one entry as the registered number of storage apparatuses 23, and, since there are no other apparatuses, the ratio is 1.

Subsequently, the MPU package 12 creates the zone allocation table 55 based on the result at SP2 (SP3). Here, the MPU package 12 has four physical links connecting the high link rate SAS expander 22A and the SAS controller 21 of FIG. 4, and, since this will be partitioned into zones of 3:1 based on the result at SP3, three physical links of 6 [Gbps] are registered in the zone group #0, and one physical link of 6 [Gbps] is registered in the zone group #1. Similarly, the MPU package 12 has four physical links connecting the high link rate SAS expander 22A and the low link rate SAS expander 22B, and, since there is only one zone based on the result at SP3, four physical links of 3 [Gbps] are registered in the zone group #1. Further, the MPU package 12 copies to the total number of same-zone storage apparatuses field 57E the value of the total number of same-zone storage apparatuses field 57E of the tentative registration table 56 of the top-level high link rate SAS expander 22A.

Subsequently, the MPU package 12 zones the physical link 72 configuring the wide link 73 to the high link rate SAS expander 22A according to the multiplexing setting calculated at SP4, and then proceeds to SP6 (SP4). Further, the MPU package 12 sets multiplexing to a designated physical link 72 among the physical links 72 configuring the wide link 73 to the high link rate SAS expander 22A according to the multiplexing setting calculated at SP4 (SP5), and then ends the sequence of FIG. 10.

(8) Discover Process

Figure 11:
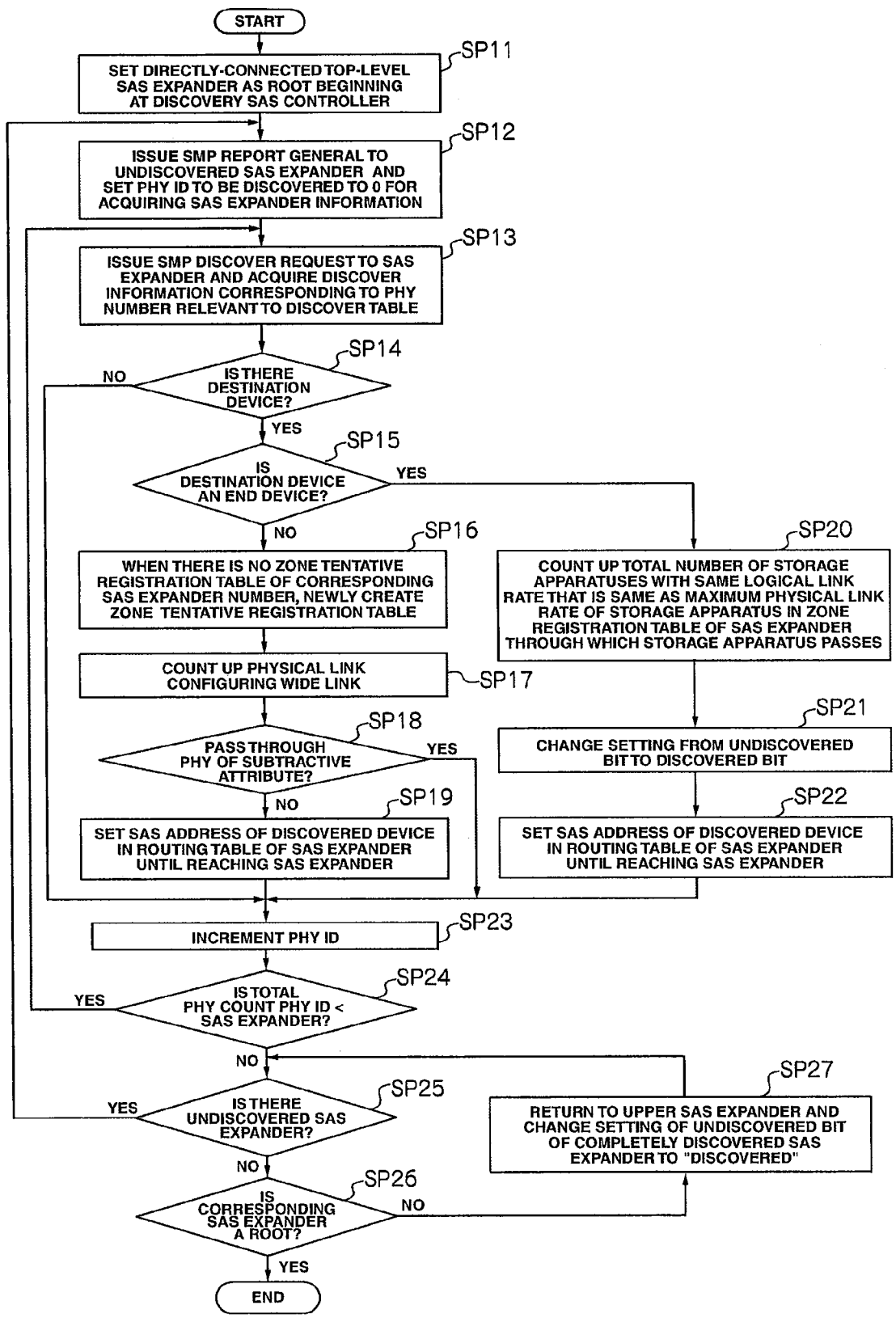
FIG. 11 is a flowchart showing the detailed sequence of the discover process.

Details concerning SP1 of FIG. 10 are now explained with reference to FIG. 11. FIG. 11 is a detailed sequence of the discover process. When the MPU package 12 detects a topology change event, it starts the sequence shown in FIG. 10, proceeds from SP2 to SP11 of this sequence, and, when this sequence is complete, it proceeds to SP2 of FIG. 10.

Foremost, the MPU package 12 sets the directly-attached top-level SAS expander 22 as the SAS expander 22 of the ROOT beginning with the SAS controller 21 to be used in the discover process. The MPU package 12 sets the initial value of the SAS expander 22 to be subject to the discover process in the ROOT, and then proceeds to SP12 (SP11).

Subsequently, the MPU package 12 issues an SMP report general as a command set of SMP (Serial Management Protocol) prescribed under the SAS standards in order to acquire information of the SAS expander 22 to the undiscovered SAS expander 22 (SAS expander 22 of the ROOT in the case of an initial value) in which a attached device has not been discovered. The MPU package 12, from this report general response, acquires information such as the number of physical phys 61 of the SAS expander 22, and the number of entries of the routing table for setting the ECM 82 of the SAS expander 22. Here, in order to discover the physical phy 61 attached to all physical phys 61 of the undiscovered SAS expander 22, the MPU package 12 initializes the physical phy number (PHY ID) of the SAS expander 22 to be subject to the discover process to "0," and then proceeds to SP13 (SP12).

Subsequently, in order to acquire information of the physical phy 61 attached to the undiscovered physical phy 61, the MPU package 12 issues an SMP discover request prescribed under the SAS standards to the undiscovered SAS expander 22. When the MPU package 12 receives an SMP discover response, it thereafter acquires various types of information on the attached devices including the discover information 54 corresponding to the physical phy number relevant to the discover table 53, and then proceeds to SP14 (SP13). Nevertheless, the zone group at SP13 is set at SP5 of FIG. 11.

The step of the MPU package 12 analyzing the discover information 54 acquired at SP13 and updating the zone tentative registration table 56 is now explained.

As a result of analyzing the discover information 54, the MPU package 12 proceeds to SP 23 when no SAS controller 21, SAS expander 22 or storage apparatus 23 exists as the destination device (SP14: NO). The MPU package 12 proceeds to SP15 when any one of the foregoing components exists as the destination device at SP14.

Similarly, the MPU package 12 proceeds to SP16 when the type of destination device is the physical phy 61 of the SAS expander 22 (SP15: NO). Further, the MPU package 12 proceeds to SP20 when the type of destination device is a storage apparatus 23 or the like (end device), and is not an SAS expander 22 (SP15: YES).

The step in a case where the destination device is the SAS expander 22 at the determination step of SP15 is now explained. When the destination device is a SAS expander (SP15: NO), the MPU package 12 registered "undiscovered" in the undiscovered bit field 53B of the discover table 53 so that the discovery process will be performed later. The MPU package 12 creates a zone tentative registration table 56 representing the pattern for multiplexing the physical link 72 from the maximum physical link rate of the physical link 72. The zone tentative registration table 56 comprises a physical link count field 56B retaining the physical link count corresponding to the physical link rates of the physical link rate field 56A; namely, 6 [Gbps], 3 [Gbps], and 1.5 [Gbps]. The zone tentative registration table 56 further comprises a logical link rate field 56C for registering all patterns of the logical link rate corresponding to each physical link count field 56B, and registers a value sought with the calculation formula of (physical link rate)÷(logical link rate) in the logical link count field 56D. The physical link count field 56B, the total number of same-zone storage apparatuses field 56E, and the necessary bandwidth ratio field 56F are set with an initial value of "0" (SP16).

Subsequently, the MPU package 12 counts up the number of physical links configuring the wide link 73 in the wide port 85, and registers this in the physical link count field 56B. The aggregate of physical phys 61 configuring the wide link 73 are equivalent to the aggregate of physical phys 61 having the same SAS address (WWN) as the destination SAS expander 22. As a result of issuing an SMP discover request to all physical phy 61, the number of physical links configuring the wide link 73 will become evident (SP17).

The MPU package 12 thereafter determines from the discover information 54 whether the discovery of the undiscovered SAS expander 22 is being conducted via the physical phy 61 of a subtractive attribute (SP18). Here, MPU package 12 to SP23 when the discovery process is being conducted via the physical phy 61 of a subtractive attribute (SP18: YES) because there is no need to create a routing table in the ECM 82 of the SAS expander 22. The MPU package 12 proceeds to SP19 when the when the discovery process is not being conducted via the physical phy 61 of a subtractive attribute (SP18: NO).

Subsequently, the MPU package 12 sets a SAS address (WWN) to the routine table of all SAS expanders 22 passed through until reaching the SAS expander 22 subject to the discover process, and then proceeds to SP23 (SP19).

The step in cases where the attached device is not the SAS expander 22 at the determination step of SP15 is now explained.

The MPU package 12 counts up the total number of same-zone storage apparatuses having a logical link rate that is the same as the maximum physical link rate of the storage apparatus 23 in all zone tentative registration tables 56 of the SAS expander 22, to which the storage apparatus 23 passes through, from the discover information 54, and then proceeds to SP21 (SP20).

Subsequently, since the SAS expander 22 is not attached, the MPU package 12 sets "discovered" in the undiscovered bit field 53B, and then proceeds to SP22 (SP21).

As with SP19, the MPU package 12 sets a SAS address (WWN) to the routing table of all SAS expanders 22 passed through until reaching the SAS expander 22 subject to the discover process, and then proceeds to SP23 (SP22).

Subsequently, the MPU package 12 increments the physical phy number in order to discover the subsequent physical phy 61, and then proceeds to SP24 (SP23).

The MPU package 12 thereafter determines whether the current physical phy number exceeds the total number of physical phys 61 of the SAS expander 22 (SP24). Here, the MPU package 12 proceeds to SP13 when the current physical phy number is less than the total number of physical phys 61 of the SAS expander 22 (SP24: YES), and repeats the discover process of the destination device attached to the subsequent physical phy 61. The MPU package 12 proceeds to SP 25 when the current physical phy number is greater than the total number of physical phys 61 of the SAS expander 22 (SP24: NO).

Subsequently, the MPU package 12 determines whether an undiscovered SAS expander 22 remains in the SAS expander 22 in which the discover process of all current physical phys 61 is complete (SP25). Here, when there is a remaining undiscovered expander (SP25: YES), the MPU package 12 sets the discover pointer of the SAS expander 22 to the subsequent undiscovered SAS expander 22, and then proceeds to SP12.

When there is no remaining undiscovered SAS expander 22 (SP25: NO), the MPU package 12 proceeds to the determination step at SP26, and determines whether the location of the SAS expander 22 currently subject to the discover process is a ROOT (SP26). Here, the MPU package 12 proceeds to SP27 when the SAS expander 22 subject to the discover process is not a ROOT (SP26: NO). The MPU package 12 returns to a level that is one level higher than the level of the SAS expander 22 subject to the discover process. The MPU package 12 thereafter sets "discovered" in the undiscovered bit field 53B of the SAS expander 22 in which the discover process was completed, and then proceeds to SP25 (SP27).

When the SAS expander 22 subject to the discover process is a ROOT at the determination step of SP26 (SP26: YES), the MPU package 12 ends this sequence since there are no more undiscovered SAS expanders 22.

In this embodiment, although a sequence is shown where the MPU package 12 of the disk array subsystem 4 takes initiative in executing the discover process, as described in the SAS standards, the SAS expander 22 may personally execute the discover process regarding the physical phy 61 attached to itself, and realize the creation of the routing table according to a method known as self-configuration where the expander makes the setting on its own. Change to the discover process based on self-configuration is in that the setting of the routing table at SP19 will no longer be required, and it will be possible to inhibit the number of SMP commands to be issued for setting the routing.

(9) Optimization of Backend Performance

Figure 12:
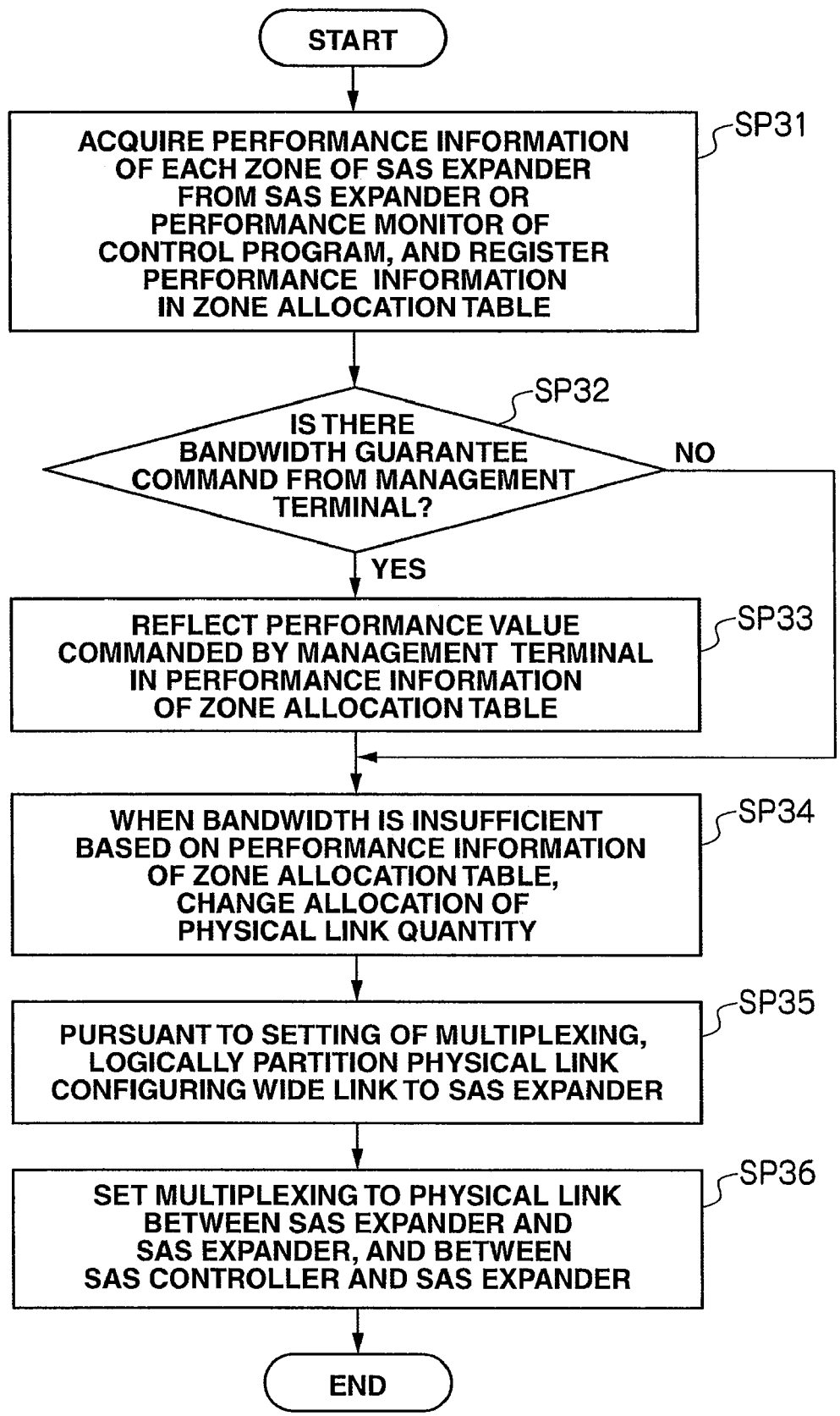
FIG. 12 is a flowchart showing the sequence for calculating the optimal configuration for multiplexing or zoning.

Details concerning SP3 of FIG. 10 are now explained with reference to FIG. 12. FIG. 12 is a sequence for calculating the optimal configuration to perform multiplexing or zoning. The MPU package 12 periodically acquires performance information, and starts this sequence when the setting of zoning or multiplexing is biased.

The MPU package 12 acquires the performance information of each zone of the SAS expander 22 from the performance monitor of the SAS expander 22 or the control program 41, registers this in the performance information of each zone field 55H of the zone allocation table 55, and then proceeds to SP32 (SP31).

Subsequently, the MPU package 12 determines at SP33 whether it received a bandwidth guarantee command from the management client 5 (SP32), and proceeds to SP33 when it received such command (SP32: YES), and proceeds to SP34 when it did not receive such command (SP32: NO).

The MPU package 12 thereafter reflects the performance value of the bandwidth guarantee commanded from the management client 5 in the performance information of each zone field 55H of the zone allocation table 55, and then proceeds to SP34 (SP33).

Subsequently, the MPU package 12 changes the allocation of the physical link count field 56B of the zone tentative registration table 56 when there is any insufficient bandwidth based on the performance information of the performance information of each zone field 55H of the zone allocation table 55 set at SP32 or SP34 (SP34), executes SP35, SP36, which are the same as SP4, SP5 of FIG. 10, and then ends this sequence.

(10) Zoning

Figure 13:
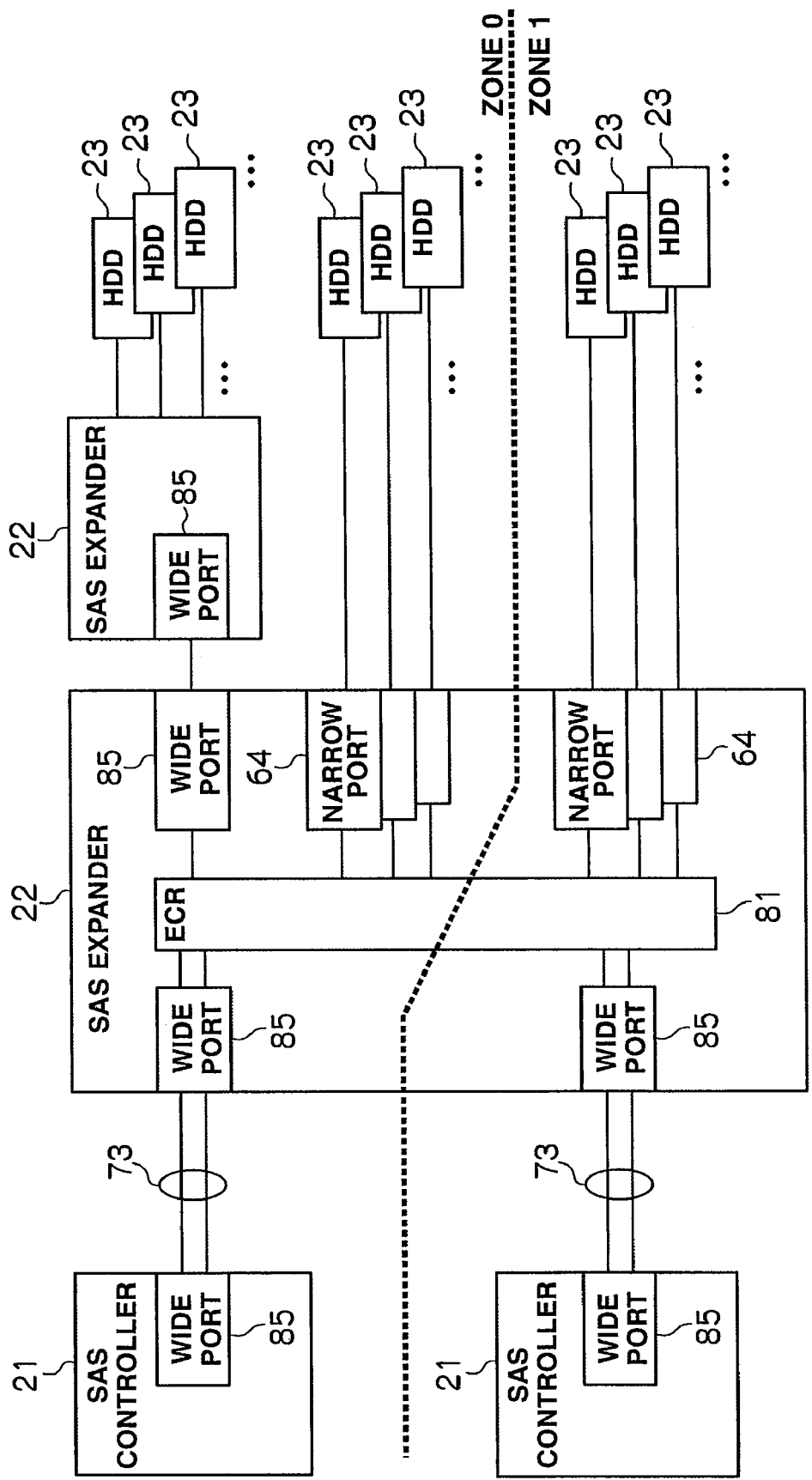
FIG. 13 is a conceptual diagram showing the configuration of zoning.
Figure 14:
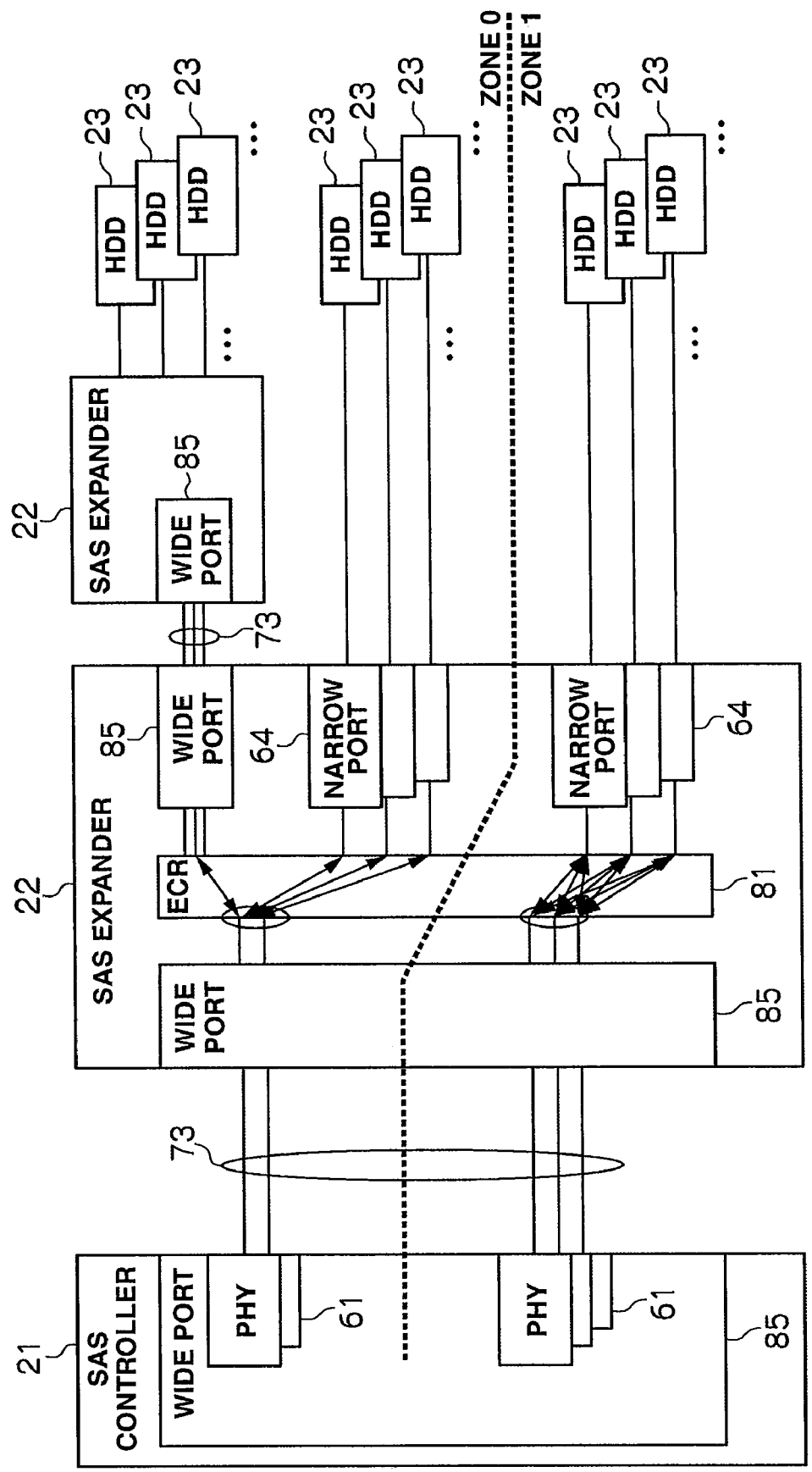
FIG. 14 is a conceptual diagram showing the configuration of zoning.

FIG. 13 and FIG. 14 show comparative examples in the configuration of zoning. FIG. 13 is implementing zoning from the perspective that there are a plurality of SAS controllers 21, and security for allowing or denying access of a plurality of storage apparatuses 23 needs to be decided.

FIG. 14 shows zoning according to this embodiment. In FIG. 14, by partitioning the plurality of physical links 72 configuring the wide link 73 in the wide port 85, such physical links 72 can be partitioned into zone groups set with a plurality of types of multiplexing, and data link can be controlled based on the optimal multiplexing.

As the function of the SAS expander 22, in order to set the routing table and zoning table of the ECM 82 in the SAS expander 22 in units of physical phys 61, the SMP target device 83 needs to interpret the logical partitioning based on zoning at step (SP5) of actually setting the zoning so that it is able to set such zoning in units of physical phys 61 configuring the wide link 73.

(11) Other Embodiments

Other embodiments of the present invention are now explained with reference to FIG. 15 to FIG. 17.

Figure 15:
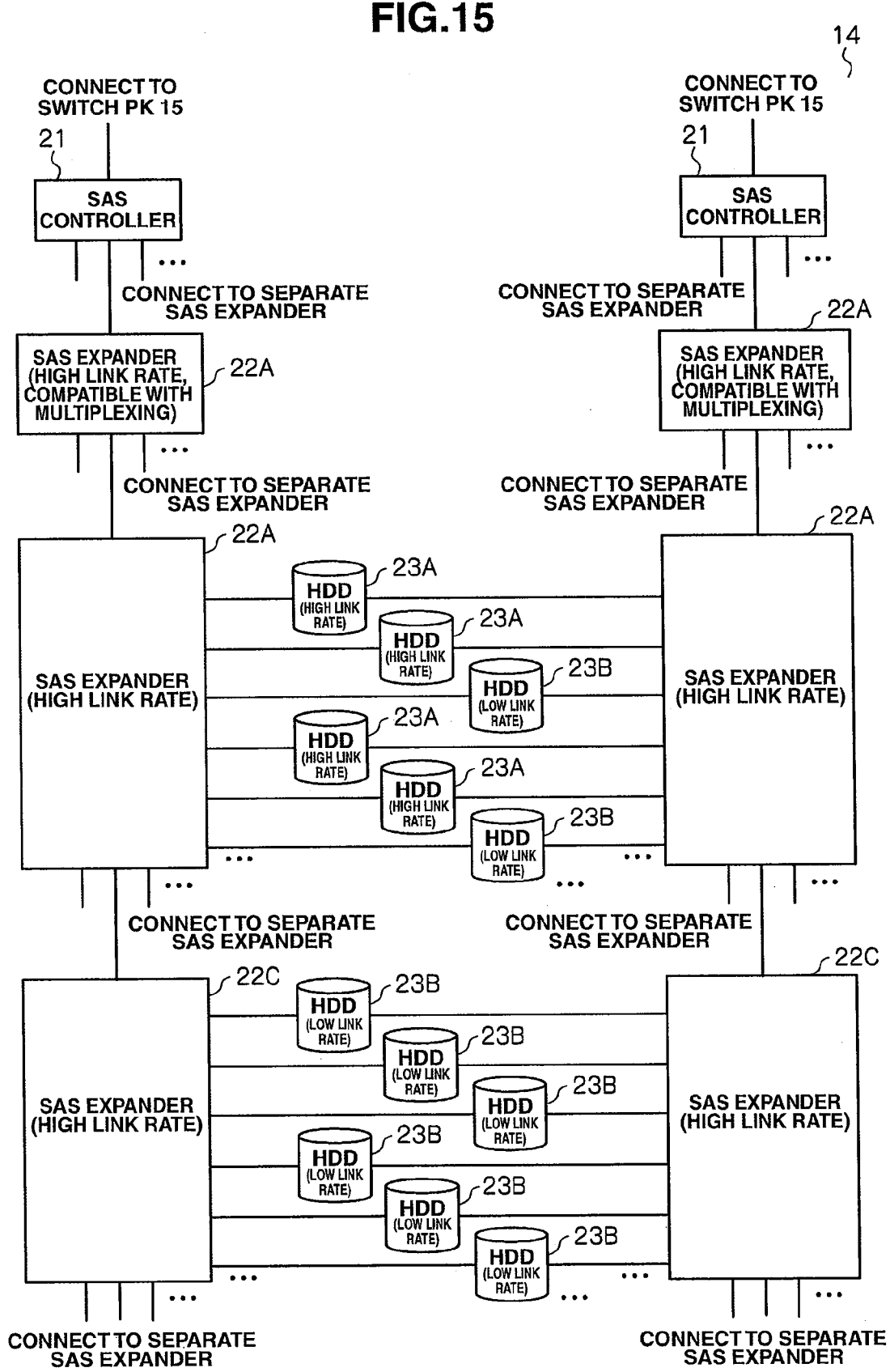
FIG. 15 is a block diagram showing the configuration of the backend of another embodiment.

The connection of the backend 14 of FIG. 15 shows a configuration where a high link rate SAS expander 22A having a high link rate and compatible with multiplexing, and a high link rate SAS expander (incompatible with multiplexing) 22C that has a high link rate but is not compatible with multiplexing coexist. In this embodiment, the configuration shows a case of connecting a low link rate storage apparatus 23B as the old disk chassis behind the new expander and the SAS expander 22A as the disk chassis and the high link rate storage apparatus 23A.

Figure 16:
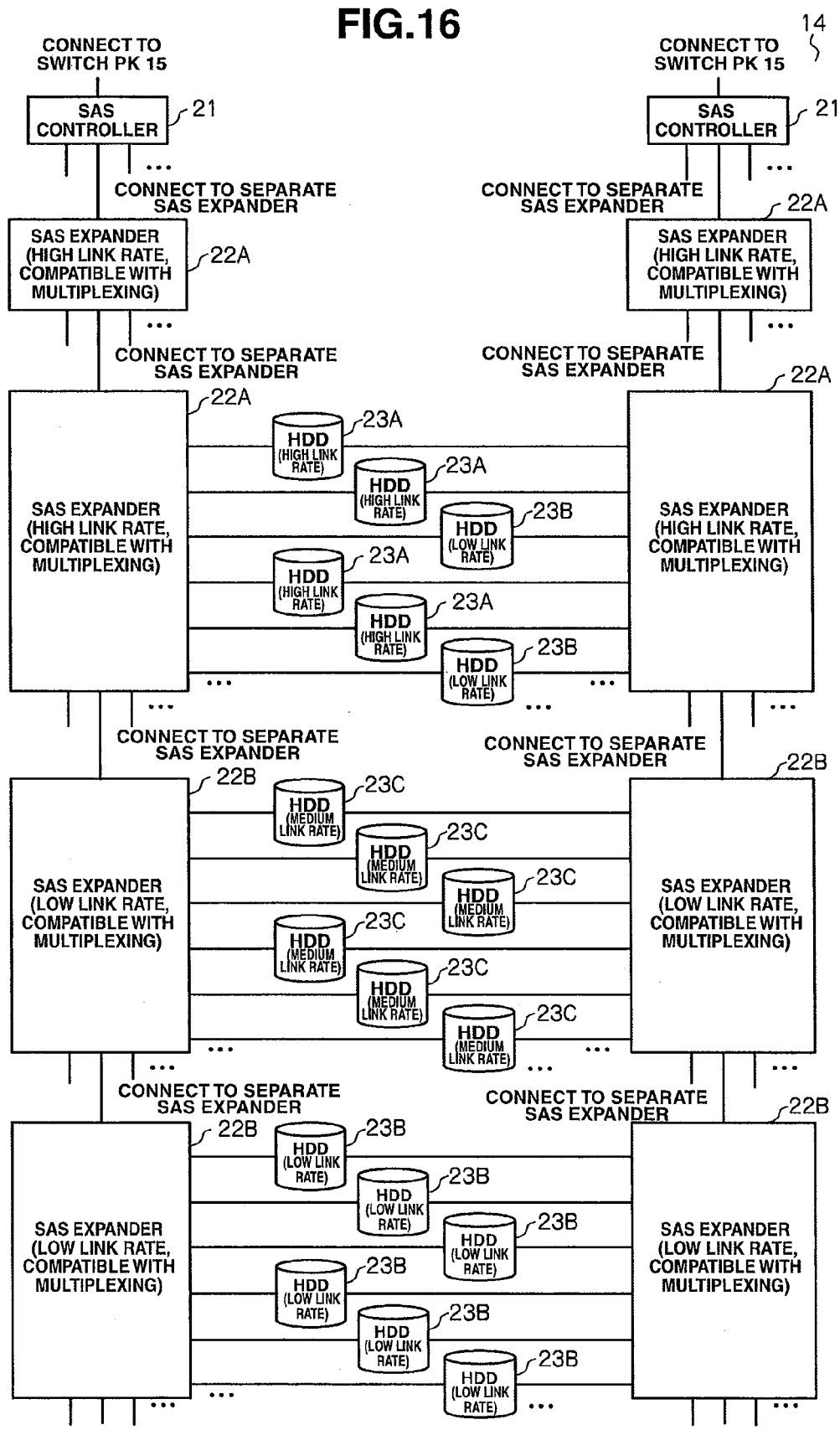
FIG. 16 is a block diagram showing the configuration of the backend of another embodiment.
Figure 17:
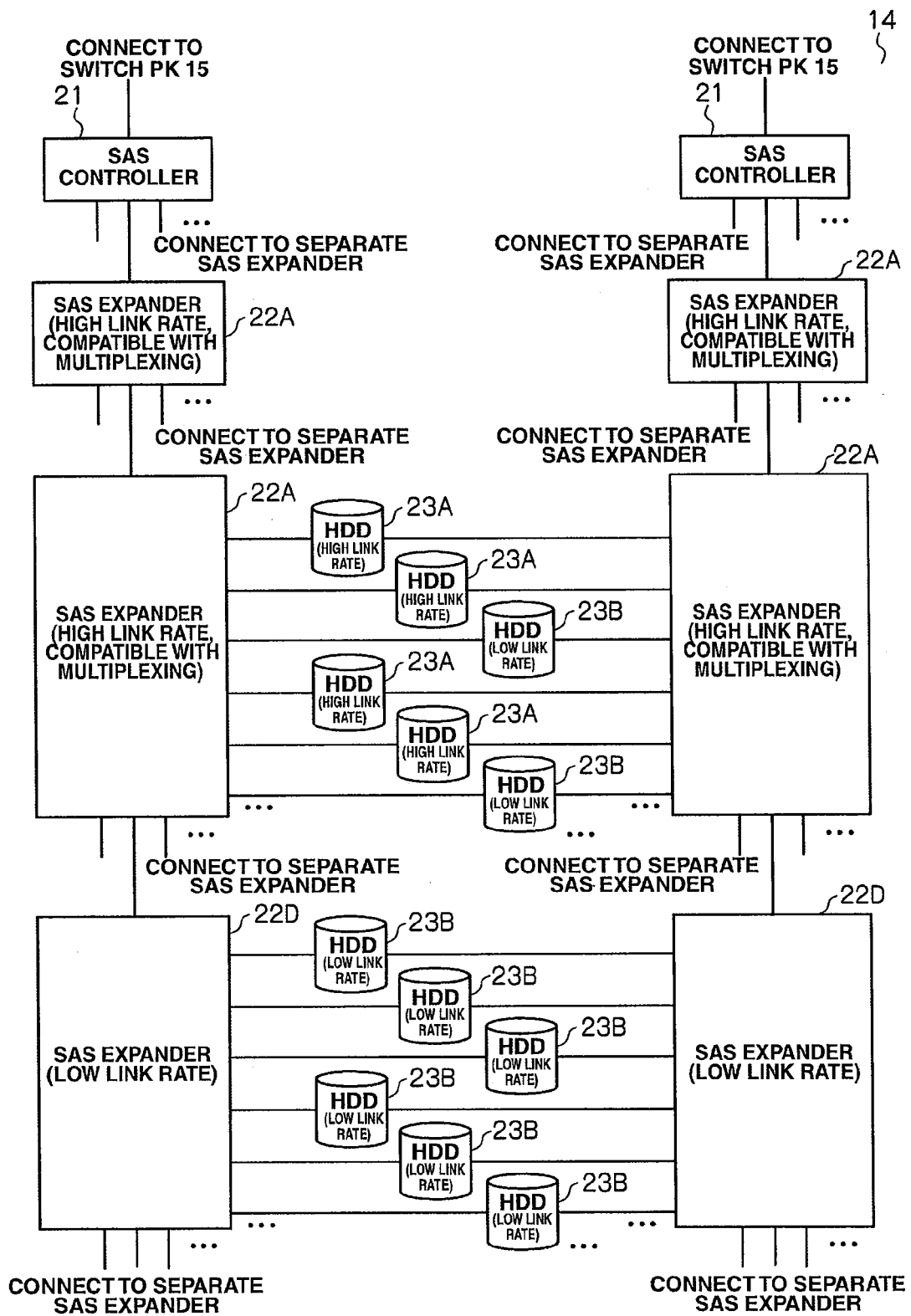
FIG. 17 is a block diagram showing the configuration of the backend of another embodiment.

Similarly, connection of the backend 14 of FIG. 16 shows a configuration where a high link rate SAS expander 22A having a high link rate and compatible with multiplexing, and a low link rate expander 22B that has a low link rate but is compatible with multiplexing coexist. Further, in addition to the high link rate storage apparatus 23A and the low link rate storage apparatus 23B, a storage apparatus 23C (medium link rate storage apparatus 23C) having a maximum physical link rate of a medium link rate has been added, and storage apparatuses 23 with three types of physical link rates coexist.

Further, connection of the backend 14 of FIG. 16 shows a configuration where a high link rate SAS expander 22A having a high link rate and compatible with multiplexing, and a low link rate expander (incompatible with multiplexing) 22D that has a low link rate and is compatible with multiplexing coexist.

Examples of combining the multiplexing setting and the zone group setting are now explained with reference to FIG. 18 to FIG. 20.

Figure 18:
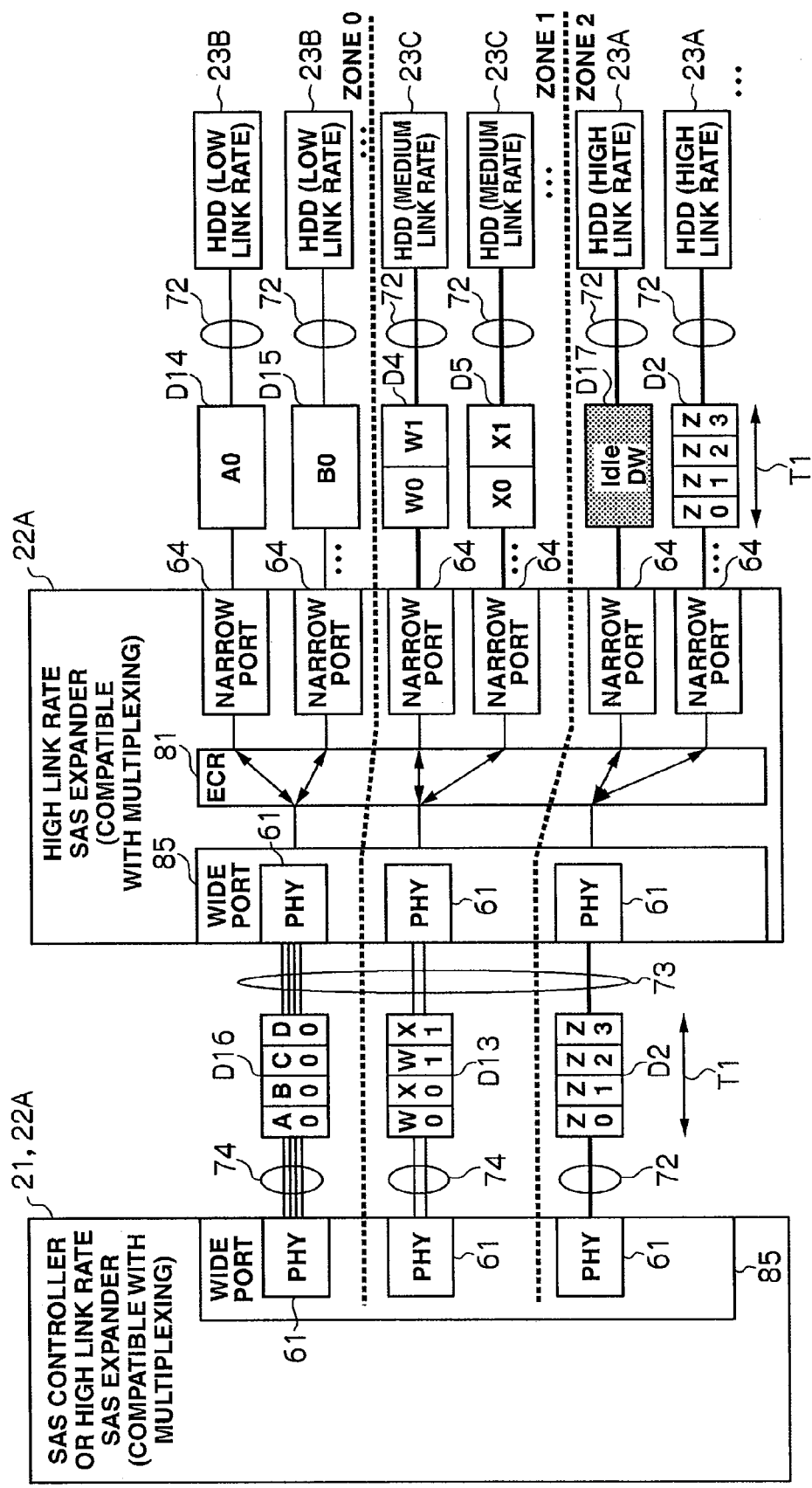
FIG. 18 is a conceptual diagram showing the combination of multiplexing setting and zone group setting.

FIG. 18 is an example where, similar to FIG. 16, storage apparatuses 23 with three types of physical link rates coexist. In the embodiment of FIG. 18, three types of multiplexing are set based on zoning into three zone groups. Here, between the SAS controller 21 and the high link rate SAS expander 22A, it is possible to link the 4DW data D16 of A0, B0, C0, D0 linked from the four low link rate storage apparatuses 23B among a plurality of low link rate storage apparatuses 23B during time T1. Similarly, between the SAS controller 21 and the high link rate SAS expander 22A, it is possible to link the 4DW data D13 of W0, W1 and X0, X1 linked from the two medium link rate storage apparatuses 23C among a plurality of medium link rate storage apparatuses 23C during the time T1 in the order of W0, X0, W1, X1. Since the data D4 and data D5 can be linked without having to introduce the AP, it is possible to effectively use the bandwidth of the logical link 74 partitioned into two, and perform such data link at the maximum physical link rate of the medium link rate storage apparatus 23C. The data D2 is the same as the case shown in FIG. 9.

Figure 19:
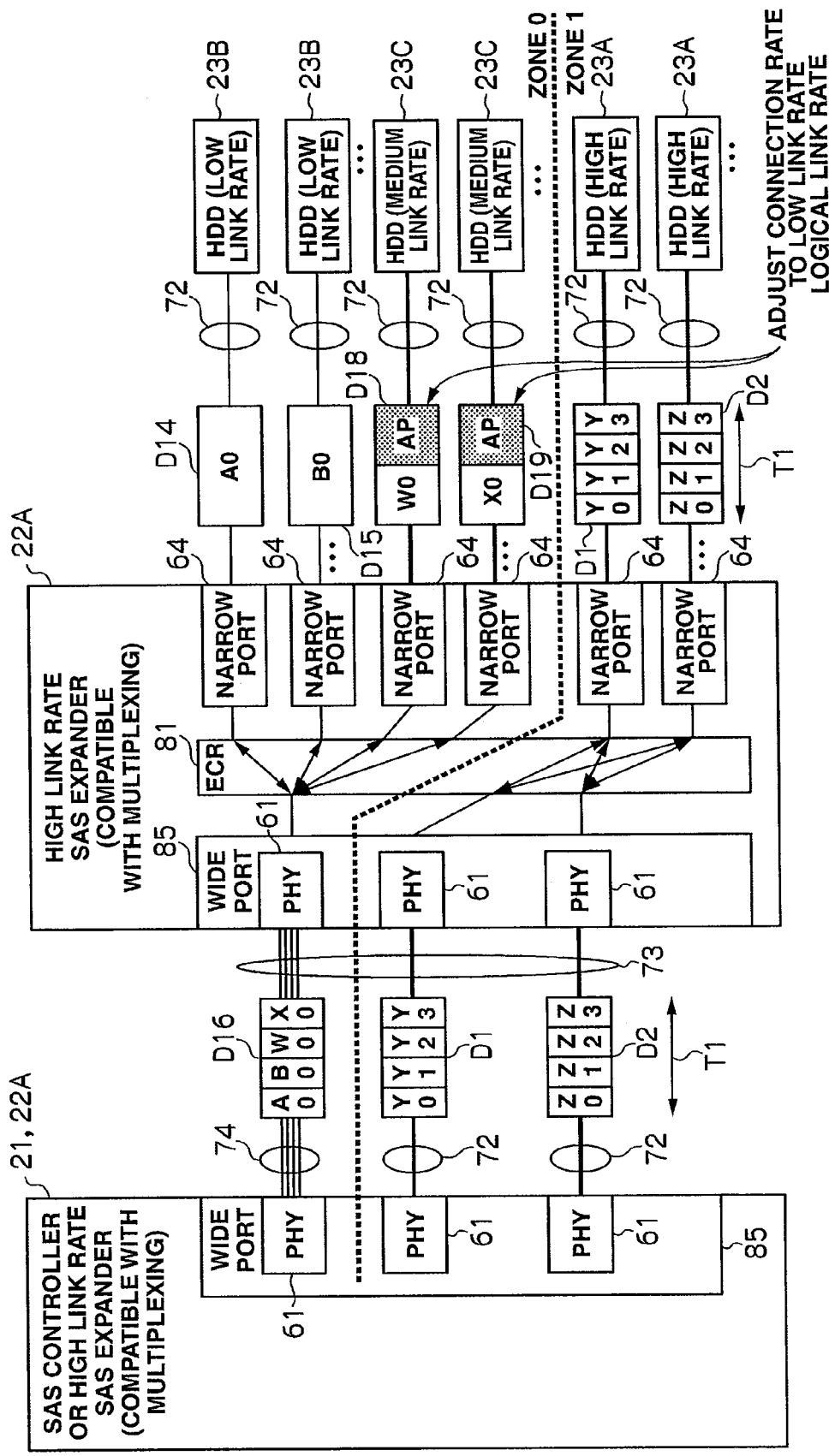
FIG. 19 is a conceptual diagram showing the combination of multiplexing setting and zone group setting.

FIG. 19 is an example where, similar to FIG. 18, storage apparatus 23A, 23B, 23C with three types of physical link rates coexist. Here, the zone group is partitioned into two. In the foregoing case, this zone configuration shows a case where the high link rate storage apparatus 23A is accessed frequently, and a physical link 72 is required between the SAS controller 21 and the high link rate SAS expander 22A. Here, since the low link rate storage apparatus 23B and the medium link rate storage apparatus 23C perform data link via the same logical link 74 that was partitioned into four, data is linked by adjusting the connection rate of the medium link rate storage apparatus 23C to the low logical link rate of the low link rate storage apparatus 23B. Thus, although the medium link rate storage apparatus 23C has the capacity to link 2DW data at time T1, it is set to link the data D18 and the data D19 added with an AP for rate matching to each 1DW data of W0 and X0.

Figure 20:
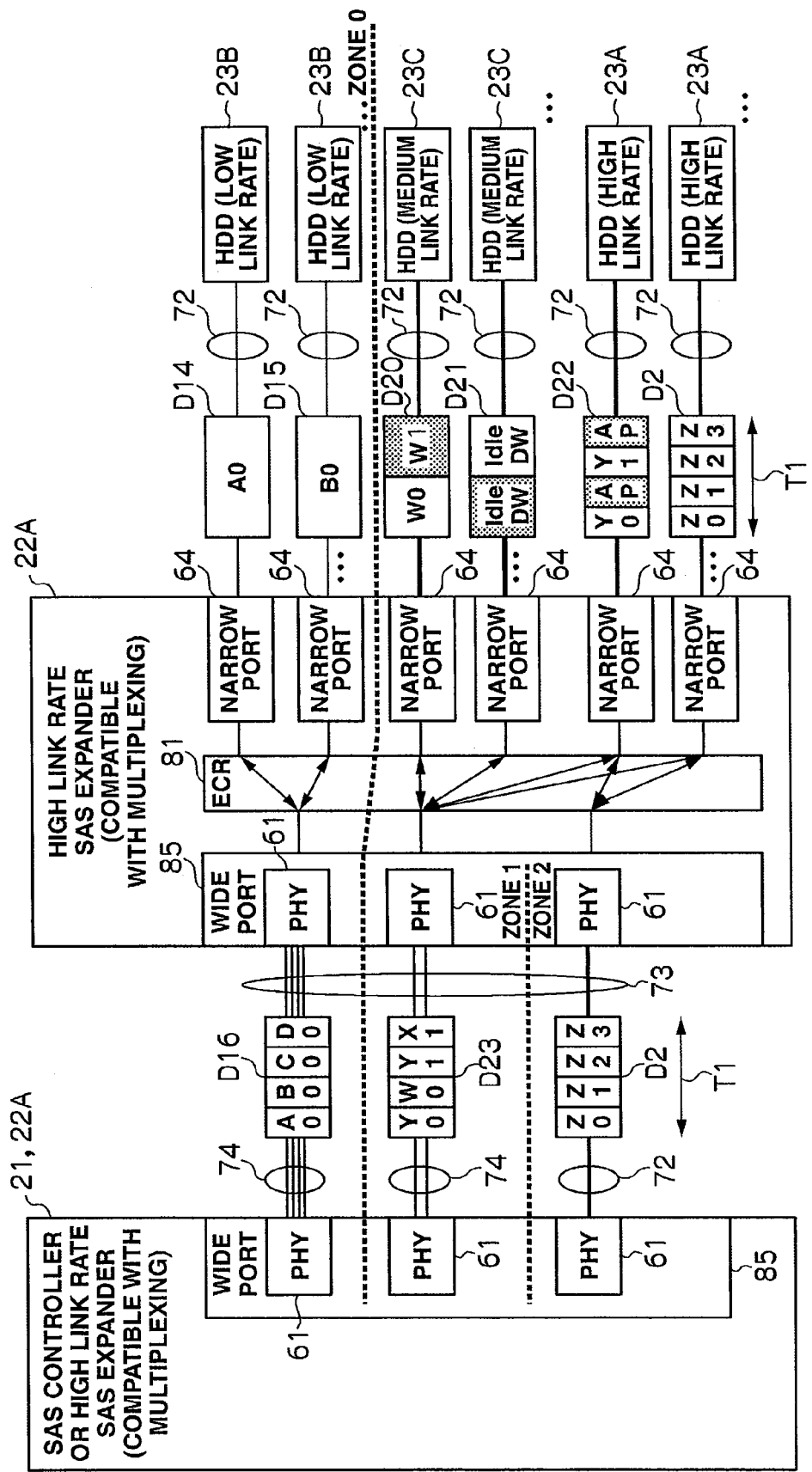
FIG. 20 is a conceptual diagram showing the combination of multiplexing setting and zone group setting.

FIG. 20 is configured the same as FIG. 18. In this configuration, the high link rate storage apparatus 23A is able to link data via two types of paths; namely, a physical link 72 having a high link rate, and a logical link 74 partitioned in two capable of simultaneously multiplexing the low link rate storage apparatus 23B. The medium link rate storage apparatus 23C is only able to link data using the partitioned logical link 74 with a medium link rate and optimized data link. As shown in FIG. 20, it is also possible to set a zone where zone 1 and zone 2 are overlapping, optimize the data link of the medium link rate storage apparatus 23C, and secure as many physical links 72 as possible as the data link of the high link rate storage apparatus 23A.

Figure 21:
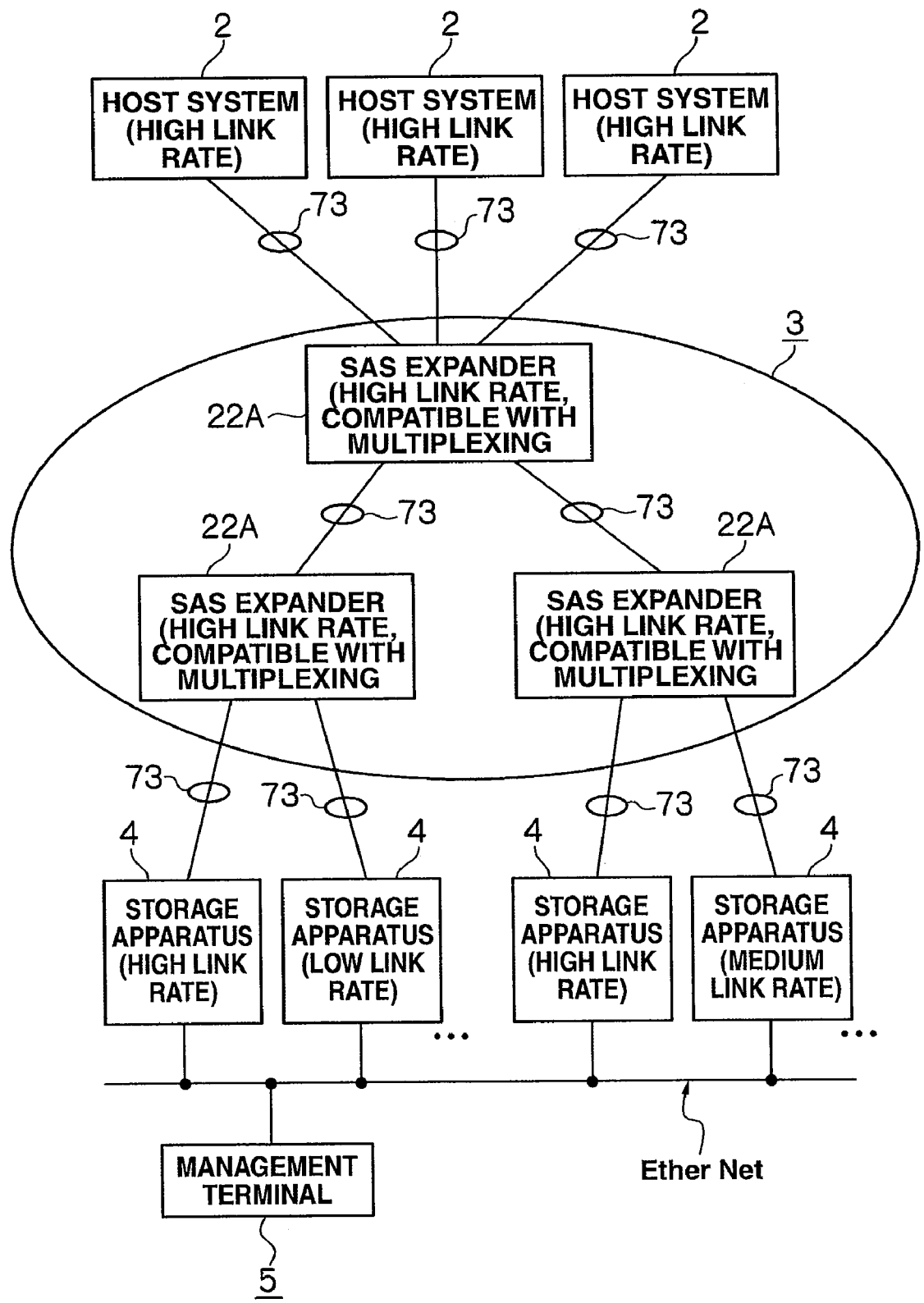
FIG. 21 is an internal block diagram of a storage system according to another embodiment.

FIG. 21 is a diagram showing the system configuration in a case of applying the SAS of this embodiment to the network 3 connecting the disk array subsystem 4 and the host 2. Here, the host 2 comprises the same functions as the MPU package 12 and the SAS controller 21, and has the programs for executing the sequences of this embodiment of the control programs 41 stored in the MPU package 12, and various types of configuration information and tables 51 to 56. In the foregoing embodiments, although the present invention applied to the backend 14 as the network of the storage apparatuses 23 in the disk array subsystem 4, as shown in FIG. 21, by using a SAS interface between the host 2 and the disk array subsystem 4, in addition to the foregoing embodiments, even in a configuration where an old storage apparatus and a new storage apparatus coexist, the same effect can be yielded by changing the multiplexing setting for each zone. Further, this configuration is not limited to the internal configuration of the disk array subsystem 4, and may also be used in the external configuration of the disk array subsystem 4 so as to obtain the same effect as the previous embodiments. The present invention may also be applied to various other configurations.

Like this, with the storage system 1, at least one or more physical links 72 among a plurality of physical links 72 for inputting and outputting data between the SAS controller 21 and the SAS expander 22, or between the SAS expander 22 and the SAS expander 22 is partitioned into at least one or more logical links 74, a plurality of logical links 74 are set to one physical link 72, data is simultaneously multiplexed to the plurality of logical links 74, and data is thereby linked to the physical links 72.

In other words, with the storage system 1, the maximum logical link rate of the logical link 74 from the SAS controller 21 to the storage apparatus 23 is made to be the same as the maximum physical link rate of the storage apparatus 23 by partitioning the physical link 72 of the network of the backend 14 at least one, two or four times more than the maximum logical link rate that is the same as the maximum physical link rate of the storage apparatus 23 so as to provide a plurality of logical links 74 to one physical link 72, and thereby perform multiplexing simultaneously.

In the foregoing case, with the storage system 1, as the group of a network in which the maximum logical link rate of the logical link 74 partitioned to the maximum logical link rate, and the maximum physical link rate of the storage apparatus 23 are the same link rate, the overall network is zoned for each type of maximum logical link rate, and the storage apparatuses 23 having a maximum physical link rate of a medium or low link rate simultaneously execute the input and output of data between two or more storage apparatuses 23 and the SAS controller 21 at a low maximum logical link rate, and perform the input and output of data between the SAS controller 21 and the storage apparatus 23 at the path passing through the multiplexed physical link 72.

Further, with the storage system 1, a storage apparatus 23 having a maximum physical link rate of a high link rate executes the input and output of data between the storage apparatus 23 and the SAS controller 21 at a high link rate maximum logical link rate, and perform the input and output of data between the SAS controller 21 and the storage apparatus 23 at a path passing through the physical link 72.

Accordingly, it is possible to control the input and output of data using the maximum physical link rate of the physical link 72 between the SAS controller 21 and a plurality of storage apparatuses 23 while maintaining the data link of the maximum physical link rate of the storage apparatuses 23.

Thereby, with the storage system 1, the backend 14 as the network of the storage apparatus 23 of the disk array subsystem 4 will be able to input and output data at the maximum throughput performance of the disk array subsystem 4, and the storage apparatuses 23 having a maximum physical link rate of a high link rate will be able to input and output data at the maximum throughput performance.

The present invention can be broadly applied to apparatuses that optimize the processing performance of a plurality of storage apparatuses storing data or the processing performance of control units.

What is claimed is:

1. A storage system, comprising:
a switching device including a first wide port, a plurality of first narrow ports and a plurality of second narrow ports, the first wide port accommodating a wide link composed of a plurality of physical links, each of the first narrow ports accommodating only one first physical link the first physical link having a first link rate, and each of the second narrow ports accommodating only one second physical link, the second physical link having a second link rate;
a plurality of first link rate storage apparatuses, each of the first link rate storage apparatuses being connected to one of the first narrow ports via the first physical link connected thereto;
a plurality of second link rate storage apparatuses, each of the second link rate storage apparatuses being connected to one of the second narrow ports via the second physical link connected thereto; and
an interface for controlling the first link rate storage apparatuses and the second link rate storage apparatuses, the interface accommodating a second wide port, the second wide port accommodating the wide link; and
a processing unit configured to partition the physical links of the wide link into two logical areas, one or more of the physical links in a first logical area of the two logical areas being used for data communication with the first link rate storage apparatuses, and one or more of the physical links in a second logical area of the two logical areas being used for data communication with the second link rate storage apparatuses, and to set up different multiplexing settings on the one or more of the physical links in the first logical area and the one or more of the physical links in the second logical area.

2. The storage system according to claim 1, wherein the multiplexing settings on the one or more of the physical links in the first logical area are determined based on a maximum link rate of the one or more of the physical links in the first logical area and the first physical links, and the multiplexing settings on the one or more of the physical links in the second logical area are determined based on a maximum link rate of the second physical links.

3. A method, comprising:
accommodating at a first wide port of a switching device a wide link composed of a plurality of physical links;
accommodating at each of a plurality of first narrow ports of the switching device only one first physical link, the first physical link having a first link rate;
accommodating at each of a plurality of second narrow ports of the switching device only one second physical link, the second switching device having a second link rate, the second link rate being lower than the first link rate;
connecting each of a plurality of first link rate storage apparatuses to one of the first narrow ports via the first physical link;
connecting each of a plurality of second link rate storage apparatuses to one of the second narrow ports via the second physical link;

controlling, by an interface, the first link rate storage apparatuses and the second link rate storage apparatuses, the interface accommodating a second wide port, the second wide port accommodating the wide link;

partitioning the plurality of physical links of the wide link into two logical areas, one or more of the physical links in a first logical area of the two logical areas being used for data communication with the first link rate storage apparatuses, and one or more of the physical links in a second logical area of the two logical areas being used for data communication with the second link rate storage apparatuses; and setting up multiplexing settings on the one or more of the physical links in the first logical area that are different from the multiplexing settings on the one or more of the physical links in the second logical area.

4. The method according to claim 3, comprising:

determining the multiplexing settings on the one or more of the physical links in the first logical area based on a maximum link rate of the one or more of the physical links in the first logical area and the first physical links; and determining the multiplexing settings on the one or more of the physical links in the second logical area based on a maximum link rate of the one or more of the physical links in the second logical area and the second physical links.

* * * * *